US009548974B2

(12) United States Patent
Takaoka

(10) Patent No.: US 9,548,974 B2
(45) Date of Patent: Jan. 17, 2017

(54) NETWORK SYSTEM, NETWORK DEVICE AND CONNECTION CONTROL METHOD

(71) Applicant: FUJITSU LIMITED, Kawasaki-shi, Kanagawa (JP)

(72) Inventor: Masanori Takaoka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 65 days.

(21) Appl. No.: 14/609,489

(22) Filed: Jan. 30, 2015

(65) Prior Publication Data
US 2015/0256525 A1 Sep. 10, 2015

(30) Foreign Application Priority Data
Mar. 7, 2014 (JP) ................................. 2014-044997

(51) Int. Cl.
H04L 29/06 (2006.01)
H04L 29/08 (2006.01)
H04W 12/06 (2009.01)

(52) U.S. Cl.
CPC ........... H04L 63/08 (2013.01); H04L 63/0853 (2013.01); H04L 67/141 (2013.01); H04W 12/06 (2013.01)

(58) Field of Classification Search
CPC .. H04L 63/08; H04L 63/0853; H04L 63/0876; H04L 67/141; H04W 12/06
USPC .......................................................... 726/7
See application file for complete search history.

(56) References Cited

U.S. PATENT DOCUMENTS

| 2001/0008014 | A1* | 7/2001 | Farrell | G06F 1/1616 713/185 |
| 2007/0101404 | A1* | 5/2007 | Higashikado | H04L 29/12584 726/3 |
| 2008/0155095 | A1 | 6/2008 | Yamaguchi | |
| 2009/0144205 | A1* | 6/2009 | Hurry | G06Q 20/085 705/75 |
| 2010/0230489 | A1 | 9/2010 | Sugiyama | |

FOREIGN PATENT DOCUMENTS

| JP | 2008-158633 | 7/2008 |
| JP | 2008-158862 | 7/2008 |
| JP | 2010-211446 | 9/2010 |
| JP | 2012-108686 | 6/2012 |

* cited by examiner

Primary Examiner — Yogesh Paliwal
(74) Attorney, Agent, or Firm — Fujitsu Patent Center

(57) ABSTRACT

A network system includes: a network device; and a portable connection device capable of connecting thereto a terminal device which accesses the network device, where the portable connection device holds authentication information related to the connection between the network device and the terminal device, the authentication information being previously set. Here, the network device includes a processor, and the processor acquires the authentication information held in the portable connection device according to the connection of the portable connection device to the network device, acquires identification information on the terminal device from the terminal device according to the connection of the terminal device to the portable connection device, and compares the acquired authentication information with the identification information on the terminal device and device information on the network device to determine whether or not the access from the terminal device is allowed.

20 Claims, 21 Drawing Sheets

FIG. 5

SETTING INFORMATION 212

| OPERATIONAL SWITCH SERIAL NUMBER | CONNECTION PORT NUMBER | USAGE PERIOD | |
| --- | --- | --- | --- |
| | | STARTING TIME | ENDING TIME |
| xxxxxx | 0,1,10,11 | t1 | t2 |

TERMINAL INFORMATION

| MAC ADDRESS |
|---|
| aa:bb:cc:dd:ee:ff |

FIG. 8

OPERATIONAL SWITCH INFORMATION (DEVICE INFORMATION) ↗ 122

| OPERATIONAL SWITCH SERIAL NUMBER | OPERATIONAL SWITCH PORT NUMBER | CURRENT TIME |
|---|---|---|
| xxxxxx | 10 | yyyymmdd hh:mm:ss |

NETWORK SYSTEM, NETWORK DEVICE AND CONNECTION CONTROL METHOD

CROSS-REFERENCE TO RELATED APPLICATION

This application is based upon and claims the benefit of priority of the prior Japanese Patent Application No. 2014-044997, filed on Mar. 7, 2014, the entire contents of which are incorporated herein by reference.

FIELD

The present invention relates to a network system, a network device and a connection control method.

BACKGROUND

In order for the security of a network to be acquired, connection from a console terminal to the network may be limited.

FIG. 21 is a diagram illustrating an example of the configuration of a network system 1000. The network system 1000 is an example of a large-scale network such as a data center, and for example, as illustrated in FIG. 21, includes a management-related network 200 and a service-related network 400. The service-related network 400 includes operation system areas 510 to 530 that a plurality of terminals 900 performing an operation access, and the management-related network 200 includes network management areas 310 to 330 that respectively manage the operation system areas 510 to 530.

As illustrated in FIG. 21, the network system 1000 includes an operational switch 600, maintenance terminals 710 to 730 and a management terminal 800. The management terminal 800 is a terminal that is used by a manager who manages the entire data center in order to manage the entire network (at least the management-related network 200). The maintenance terminals 710 to 730 are terminals that are used by a user (for example, a maintenance person) who utilizes part of the network system 1000 in order to manage the network management areas 310 to 330 related to the department of the user.

The operational switch 600 is a device that is connected to the network management areas 310 to 330 and switches access from the maintenance terminals 710 to 730 connected to ports of the operational switch 600 to the network management areas 310 to 330 corresponding to the connection ports.

As described above, the operational switch 600 connects the maintenance terminals 710 to 730 to the network management areas 310 to 330 corresponding to the ports to which the maintenance terminals 710 to 730 are connected. However, since the maintenance person does not manage the entire network system 1000, if the maintenance person can access the network management areas 310 to 330 other than an area related to the department of the maintenance person, the security of the network system 1000 is degraded.

Hence, for example, in order for the maintenance person to access only the specific network management areas 310 to 330, the manager may prevent the maintenance person from connecting the maintenance terminals 710 to 730 to erroneous ports of the operational switch 600.

As an example, it can be considered that a port protect function is provided in the operational switch 600. The port protect function is a function of port security in which identification information on the maintenance terminals 710 to 730 to be connected is previously set for the individual ports of the operational switch 600, and when the maintenance terminals 710 to 730 whose identification information is not registered are connected, the connection ports are blocked. As the identification information on the maintenance terminals 710 to 730, there are Media Access Control (MAC) addresses.

As another example, it can be considered that security locks are provided in individual ports of the operational switch 600. The security lock is a component (module) that can be attached to the slot of the port, and is locked by a security key (release key) and is thereby difficult to remove physically from the slot. For example, the manager issues a security key for the port to allow the maintenance person to use to the maintenance person, and the maintenance person uses the issued security key to release the security lock of the port to be used, connects the maintenance terminals 710 to 730 to the port and uses the port.

As a related technology, a communication device system is known in which a card-type device is inserted into or connected to a control target device, and thus remote maintenance control or remote monitoring on the control target device is performed by a maintenance control or remote monitoring device connected to a gateway (for example, see patent document 1). In this technology, the device ID of the control target device stored in the card-type device and a device ID acquired from the control target device are compared, and when they agree with each other, a device authentication ID is transmitted to the gateway to perform the authentication.

A technology is also known in which a network device uses a combination of a port number to which the device is connected and the MAC address of the device to determine whether or not login to the network device is allowed (for example, see patent document 2). Another technology is also known in which when a WEB page supplied by a monitoring host device is browsed from a WEB page for a manager supplied by an image formation device, the specific information of the image formation device and access request time information are used for authentication (for example, see patent document 3).

Furthermore, a log information collection system is also known in which a log collection module that is automatically started up when a Universal Serial Bus (USB) memory is connected to a host is provided, and log information is stored by the log collection module (for example, see patent document 4). In this technology, the log collection module acquires a device ID from a target device of maintenance and stores it in the USB memory, and a maintenance terminal acquires an access ID corresponding to the device ID from an information server and stores it in the USB memory. Then, the log collection module receives authentication in the target device through the access ID to collect the log information.

[Patent document 1] Japanese Laid-open Patent Publication No. 2010-211446

[Patent document 2] Japanese Laid-open Patent Publication No. 2012-108686

[Patent document 3] Japanese Laid-open Patent Publication No. 2008-158633

[Patent document 4] Japanese Laid-open Patent Publication No. 2008-158862

In the port protect function described above, since the manager registers MAC addresses for the individual ports of the operational switch 600, when the operational switch 600 has a large number of ports, there is a possibility that the number of operation steps is increased and a setting mistake or the like is made. Moreover, since the manager previously receives MAC address information for the maintenance terminals 710 to 730, when a large number of maintenance terminals 710 to 730 are present, there is a possibility that the number of operation steps increases and a setting mistake or the like is made.

In the method of using the security lock, the security locks are provided in the individual ports of the operational switch 600. Hence, since the manager manages the security keys corresponding to the number of security locks provided, the management is complicated, and when the security key is lost, it may be difficult to release the security lock.

SUMMARY

According to an aspect of the embodiments, a network system includes: a network device; and a portable connection device capable of connecting thereto a terminal device which accesses the network device, wherein the portable connection device holds authentication information related to the connection between the network device and the terminal device, the authentication information being previously set. The network device includes a processor, and the processor acquires the authentication information held in the portable connection device according to the connection of the portable connection device to the network device, and acquires identification information on the terminal device from the terminal device according to the connection of the terminal device to the portable connection device. In addition, the processor compares the acquired authentication information with the identification information on the terminal device and device information on the network device to determine whether or not the access from the terminal device is allowed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of setting information held by the portable module illustrated in FIG. 4;

FIG. 6 is a diagram illustrating an example of terminal information held by the portable module illustrated in FIG. 4;

FIG. 8 is a diagram illustrating an example of operational switch information held by the operational switch illustrated in FIG. 7.

DESCRIPTION OF EMBODIMENTS

An embodiment will be described below with reference to accompanying drawings.

[1] An Embodiment

[1-1] Description of a Network System

Figure 1:
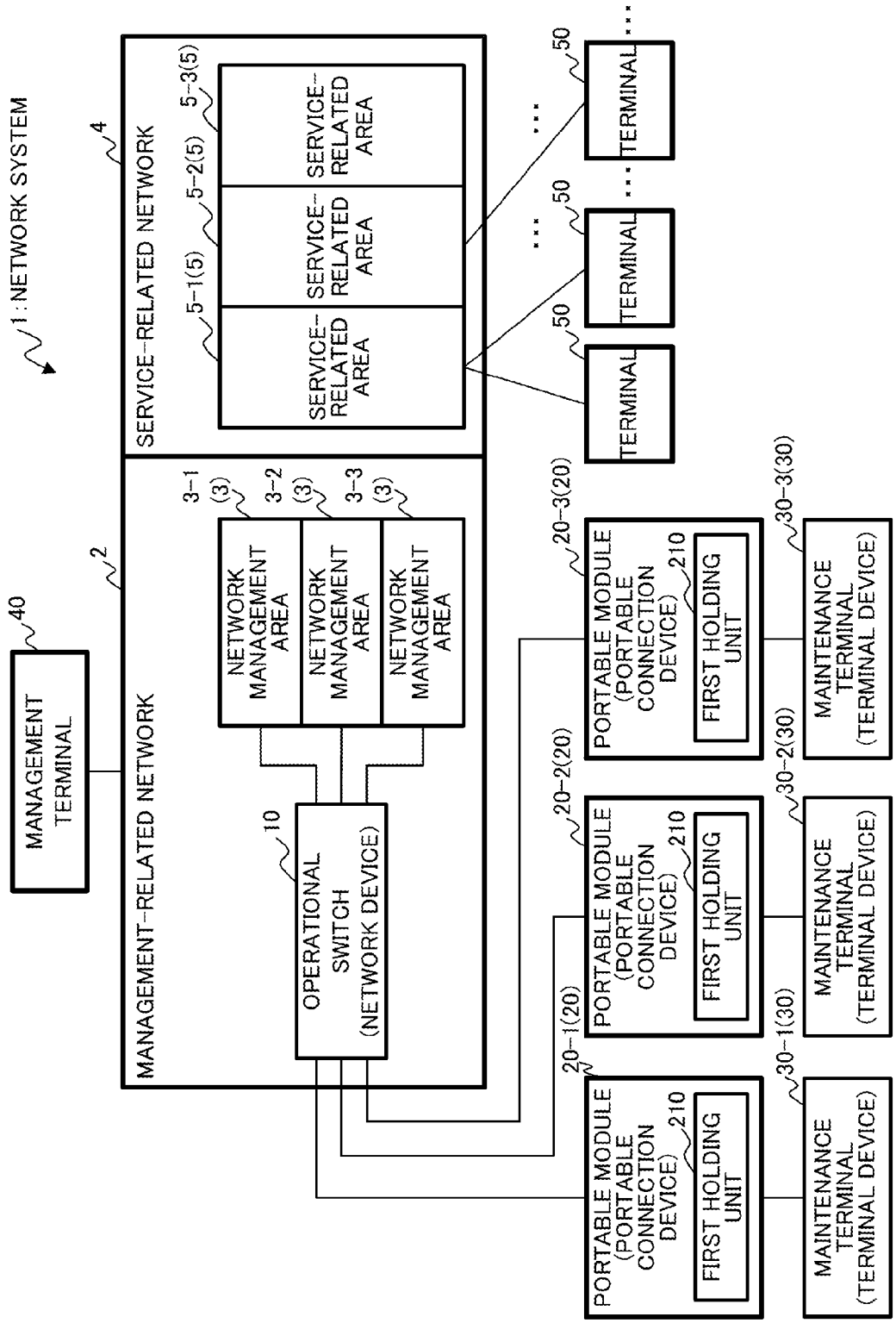
FIG. 1 is a diagram illustrating an example of the configuration of a network system according to an embodiment.

FIG. 1 is a diagram illustrating an example of the configuration of a network system 1 according to an embodiment. The network system 1 is an example of the whole or part of a large-scale network such as a data center or a main system. As illustrated in FIG. 1, the network system 1 can include a management-related network 2, a service-related network 4 and one or more terminals 50 that access the service-related network 4.

Here, the service-related network 4 can include a plurality of (in the example of FIG. 1, three) operation system areas 5-1 to 5-3 that one or more terminals 50 performing an operation access. The management-related network 2 can include a plurality of (in the example of FIG. 1, three) network management areas 3-1 to 3-3 that manage the operation system areas 5-1 to 5-3, respectively. In other words, the network management area 3-1 manages the operation system area 5-1, the network management area 3-2 manages the operation system area 5-2 and the network management area 3-3 manages the operation system area 5-3. In the following description, when the operation system areas 5-1 to 5-3 are not distinguished, they are represented simply by symbol 5, and when the network management areas 3-1 to 3-3 are not distinguished, they are represented simply by symbol 3.

A device that forms the management-related network 2 and the service-related network 4 may share at least part of hardware or may form separate pieces of hardware. The management-related network 2 and the service-related network 4 may be logically separated by, for example, a Virtual Local Area Network (ULAN).

As illustrated in FIG. 1, the network system 1 can include an operational switch 10, a plurality of (in the example of FIG. 1, three) portable modules 20-1 to 20-3, a plurality of (in the example of FIG. 1, three) maintenance terminals 30-1 to 30-3 and a management terminal 40. In the following description, when the portable modules 20-1 to 20-3 are not distinguished, they are represented simply by symbol 20, and when the maintenance terminals 30-1 to 30-3 are not distinguished, they are represented simply by symbol 30.

The maintenance terminals 30-1 to 30-3 are an example of the terminal device that is used by a user who utilizes part of the network system 1 to manage the network management areas 3-1 to 3-3 related to the department of the user. In other words, the maintenance terminal 30-1 is used for the management of the network management area 3-1, the maintenance terminal 30-2 is used for the management of the network management area 3-2 and the maintenance terminal 30-3 is used for the management of the network management area 3-3. In the following description, it is assumed that the user who uses the maintenance terminal 30 is a maintenance person who manages (maintenance) part of the network system 1 (the network management areas 3-1 to 3-3 related to the department of the user).

The operational switch 10 is an example of the network device that is connected to each of the network management areas 3-1 to 3-3, and switches access from a device connected to a port of the operational switch 10 to the network management areas 3-1 to 3-3 corresponding to the connection port. In other words, the operational switch 40 can connect the maintenance terminal 30 to the network management area 5 corresponding to the port to which the maintenance terminal 30 is connected. Examples of the operational switch 10 include a Layer 2 (L2) switch, a Layer 3 (L3) switch, a network device such as a rooter and information processing devices such as a PC and a server.

Figure 2:
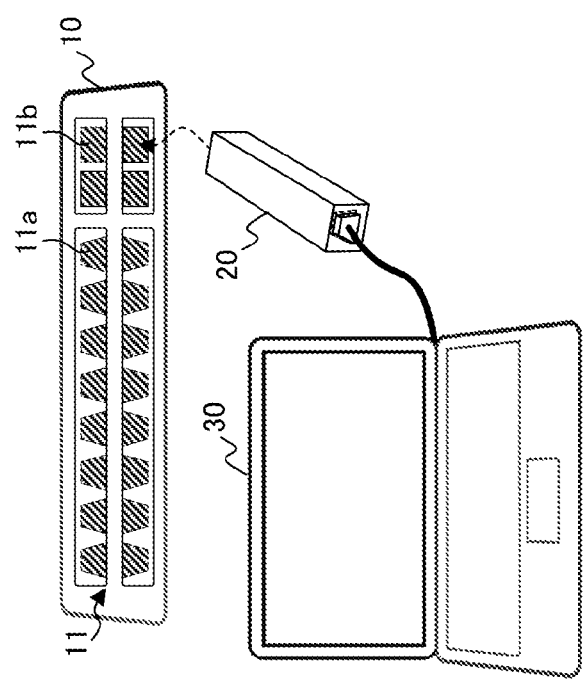
FIG. 2 is a diagram illustrating an example of the connection between an operational switch and a maintenance terminal illustrated in FIG. 1.

FIG. 2 is a diagram illustrating an example of the connection between the operational switch 10 and the maintenance terminal 30 illustrated in FIG. 1. As illustrated in FIG. 2, the operational switch 10 can include a plurality of ports (slots) 11 to which a device can be connected. A connector of a cable, a module or the like used for communication in a network such as the Ethernet (registered trademark) can be inserted (set) into the port 11.

For example, as illustrated in FIG. 2, the port 11 can include one or more ports 11a to which a connector or a module corresponding to RJ-45 can be connected and one or more ports 11b to which another module can be connected. Examples of the module that can be connected to the port 11b include a Small Form Factor Pluggable (SFP), an SFP+ and a Quad SFP (QSFP). Other examples of the module that can be connected to the port 11b include a 10 Gigabit Small Form Factor Pluggable (XFP), a CXP (C: Roman numeral for 100/Hexadecimal 12, XP: eXtended-capability Pluggable form-factor) and a Gigabit Interface Converter (GBIC).

As illustrated in FIGS. 1 and 2, the maintenance terminals 30-1 to 30-3 according to the embodiment are connected to the operational switch 10 through the portable modules 20-1 to 20-3.

Figure 3:
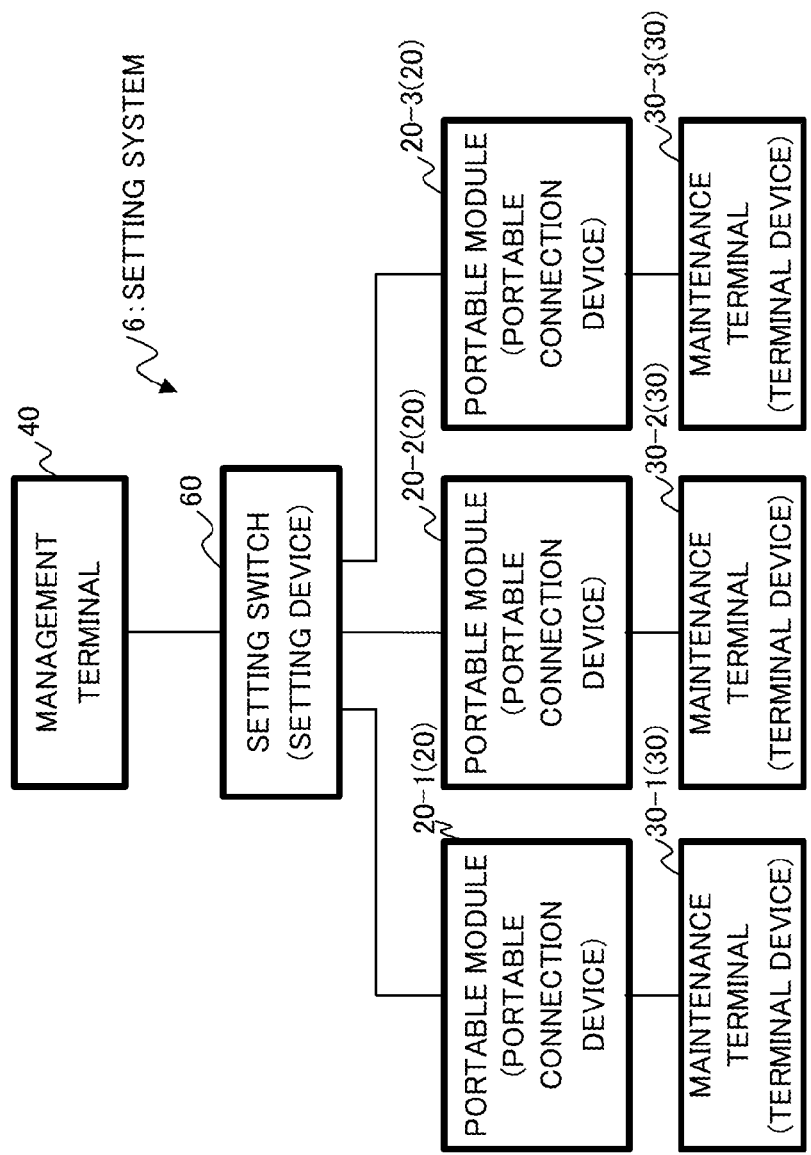
FIG. 3 is a diagram illustrating an example of the configuration of a setting system that performs a connection setting on a portable module illustrated in FIG. 1.

The portable module 20 is a module that is mounted on an input-output port 11 of a network switch such as the operational switch 10 or a setting switch 60 (see FIG. 3). The maintenance terminal 30 or the management terminal 40 can be connected to the portable module 20. In other words, the portable module 20 is used as an adapter through which (through which access is achieved) the maintenance terminal 30 or the management terminal 40 connected to the portable module 20 is connected to the operational switch 10 or the setting switch 60.

For example, as illustrated in FIG. 2, the portable module 20 can include a port into which a connector of a cable from the maintenance terminal 30 can be inserted and which corresponds to RJ-45 and the terminal, such as the SFP described above, that can be connected (inserted) to the port 11b of the operational switch 10.

As illustrated in FIG. 1, the portable module 20 can include a first holding unit 210. The first holding unit 210 can hold information (setting information) on the connection position of the portable module 20 to the operational switch 10 and information (terminal information) on the maintenance terminal 30 using the portable module 20. In other words, it can be said that the portable module 20 is an example of a portable connection device that can connect the maintenance terminal 30 which accesses the operational switch 10, and is an example of a portable connection device that holds previously set connection information (authentication information) on the connection between the operational switch 10 and the maintenance terminal 30. Examples of the first holding unit 210 include a non-volatile memory such as a flash memory.

When the maintenance terminal 30 is connected to the port 11b through the portable module 20, the operational switch 10 can authenticate the connection of the maintenance terminal 30 by reading the setting information and the terminal information held by the first holding unit 210 of the portable module 20. For example, the operational switch 10 can determine, based on the read setting information, whether or not the portable module (maintenance terminal 30) is connected to the previously registered port 11b. The operational switch 10 can also determine, based on the read terminal information, whether or not the previously registered maintenance terminal 30 is connected. Then, based on the results of these determinations, the operational switch 10 can continue the link of the port 11b to which the portable module 20 is connected or can block the port 11b.

As described above, the network system 1 according to the embodiment utilizes the non-volatile memory of the portable module 20 mounted on the operational switch 10, and thereby can securely manage the port 11 through which the maintenance person accesses the network management area 3.

In other words, the operational switch 10 according to the embodiment that can be connected to the portable module 20 can authenticate, based on the connection information stored in the portable module 20, the connection port 11b to which the maintenance terminal 30 is connected and the maintenance terminal 30. Hence, since a manager or the like does not need to previously set the terminal information on the maintenance terminal 30 for the operational switch 10, it is possible to easily acquire security when the operational switch 10 is managed.

Furthermore, the authentication information used when the operational switch 10 performs authentication can be stored in the portable module 20 that is an adapter used for the connection (access) between the maintenance terminal 30 and the operational switch 10, with the result that the management is easy and it is possible to reduce the risk of loss. In other words, since the maintenance person does not carry a device or the like used only for the authentication, it is possible to reduce risk on security.

With reference back to FIG. 1, the management terminal 40 is a terminal that is used by the manager who manages the entire data center so as to manage the entire network (at least the management-related network 2). The management terminal 40 can control the management-related network 2 (for example, the operational switch 10) through an unillustrated network. The management terminal 40 also can control the setting switch 60 (see FIG. 3) that sets the connection information for the portable module 20 through an unillustrated network.

FIG. 3 is a diagram illustrating an example of the configuration of a setting system 6 that performs the connection setting on the portable module 20 illustrated in FIG. 1. The setting system 6 is a system that is temporarily formed by the portable module 20, the maintenance terminal 30, the management terminal 40 and the setting switch 60 so as to set the connection information for the first holding unit 210 of the portable module 20. As illustrated in FIG. 3, the management terminal 40 uses the setting switch 60 and thereby can perform the connection setting (the registration/updating of the connection information) on the portable module 20. The setting switch 60 can include the same port 11 as the operational switch 10.

The details of the operational switch 10, the portable module 20 and the setting switch 60 will be described later.

Examples of the maintenance terminal 30, the management terminal 40 and the terminal 50 include information processing devices such as a Personal Computer (PC), a tablet, a mobile telephone and a server. Examples of the setting switch 60 include network devices such as a L2 switch, a L3 switch and a rooter and information processing devices such as a PC and a server.

[1-2] Detailed Description of the Setting System

Figure 4:
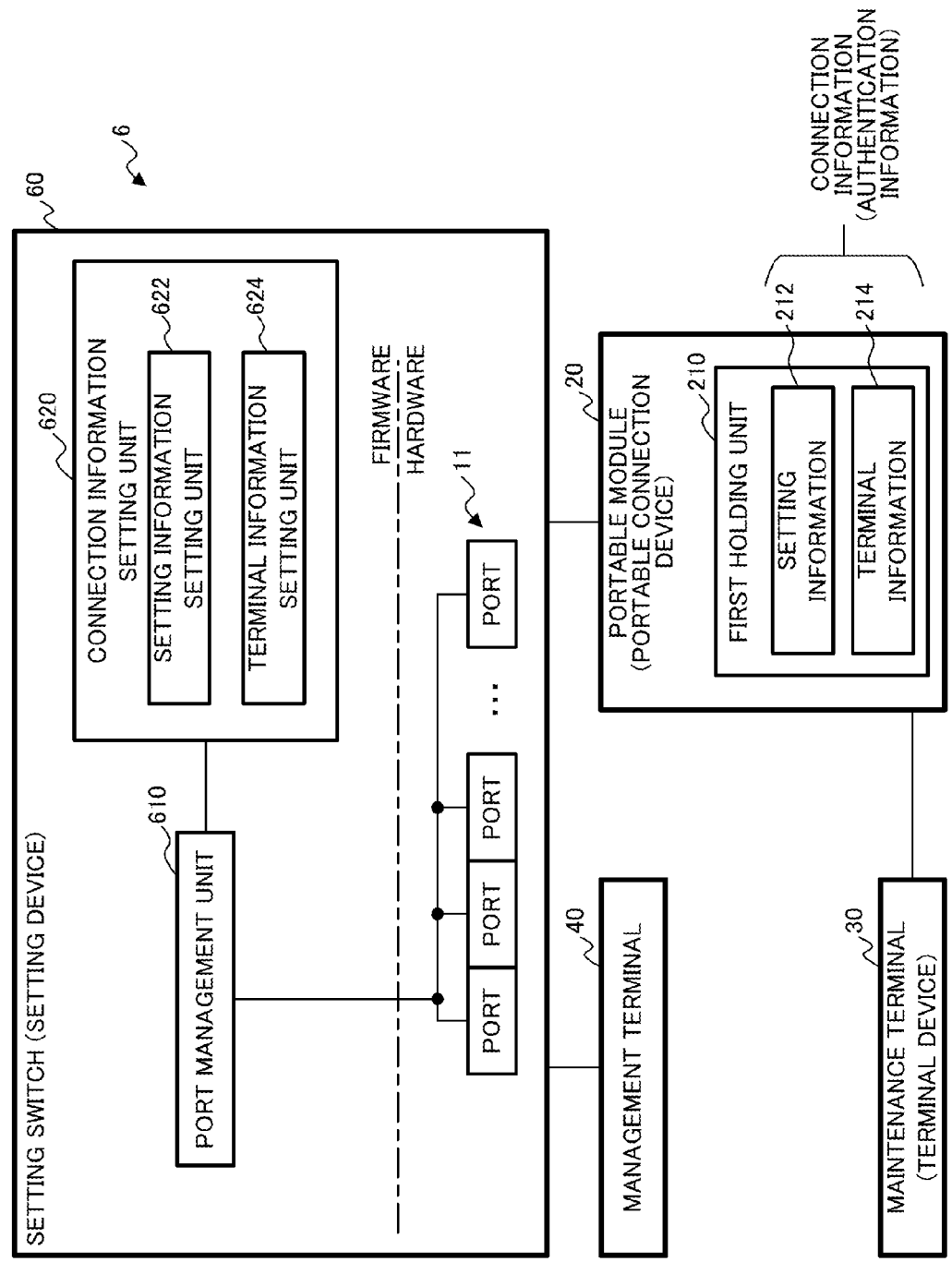
FIG. 4 is a diagram illustrating an example of the detailed configuration of the setting system illustrated in FIG. 3.

The setting system 6 illustrated in FIG. 3 will then be described in detail with reference to FIGS. 4 to 6. FIG. 4 is a diagram illustrating an example of the detailed configuration of the setting system 6 illustrated in FIG. 3, and FIGS. 5 and 6 are respectively diagrams illustrating an example of the setting information 212 and the terminal information 214 held by the portable module 20 illustrated in FIG. 4.

Although in FIG. 4, an example where the portable module 20 and the management terminal 40 are connected to the setting switch 60 is illustrated, the connection and the removal of the portable module 20 and the management terminal 40 to and from the setting switch 60 can be performed as appropriate. Likewise, although in FIG. 4, an example where the maintenance terminal 30 is connected to the portable module 20 is illustrated, the connection and the removal of the maintenance terminal 30 to and from the portable module 20 can be performed as appropriate.

As illustrated in FIG. 4, the setting switch (setting device) 60 can include a port management unit 610 and a connection information setting unit 620. The port management unit 610 and the connection information setting unit 620 are realized by a processor that performs the firmware of the setting switch 60.

The port management unit 610 detects the connection of the portable module 20, the maintenance terminal 30 or the management terminal 40 to manage access between the portable module 20, the maintenance terminal 30 or the management terminal 40. For example, the port management unit 610 can perform login authentication when, in the port 11 (port 11*a*), access occurs from the management terminal 40 through a network such as a Telecommunication Network (Telnet). Then, the port management unit 610 can receive a request from the management terminal 40 when the login authentication is successfully performed. The login authentication can be performed by known various methods, and its detailed description will be omitted.

When connection from the management terminal 40 through a cable to a serial port 12 (see FIG. 20) used for, for example, the control of the port 11 or the setting switch 60 is detected, the port management unit 610 can also receive a request as in the access through the network.

The port management unit 610 can detect that the portable module 20 is connected to the port 11 (port 11*b*), and can read data from the first holding unit 210 of the portable module 20 or write data on the first holding unit 210.

Furthermore, the port management unit 610 can detect, based on access from the maintenance terminal 30, that the maintenance terminal 30 is connected to the portable module 20 connected to the port 11. For example, when the port management unit 610 receives an Address Resolution Protocol (ARP) request from the maintenance terminal 30, the port management unit 610 can detect that the maintenance terminal 30 is connected to the portable module 20. Here, the port management unit 610 can return an ARP response to link-up the communication with the maintenance terminal 30, acquire the MAC address of the maintenance terminal 30 included in the ARP request and output it to the connection information setting unit 620.

The connection information setting unit 620 performs access on writing, deletion, reading and the like for the portable module 20. For example, the connection information setting unit 620 can delete the connection information held by the first holding unit 210 of the portable module 20, and set the connection information for the first holding unit 210. For example, the connection information setting unit 620 can include the connection information setting unit 620 and a setting information setting unit 622.

The setting information setting unit 622 writes the setting information 212 indicated by the request from the management terminal 40 through the port management unit 610 on the first holding unit 210 of the portable module 20.

As illustrated in FIG. 5, the setting information 212 can include information on one or more connection candidate positions of the portable module 20 to the operational switch 10. For example, for the setting information 212, an operational switch serial number that is an example of information which identifies the operational switch 10, a connection port number that is an example of information which identifies the connection candidate position to which the portable module 20 is connected and a usage period of the operational switch 10 are set. Although the usage period can include a starting time (stating date and time) and an ending time (ending date and time), there is no limitation on this, and for example, a starting time (stating date and time) and how much time (period) the operational switch 10 may be used may be set.

As an example, the setting information 212 illustrated in FIG. 5 includes information indicating that at least one port 11 (port 11*b*) of connection port numbers "0, 1, 10, 11" in an operational switch serial number "xxxxxx" is used from the starting time "t1" to the ending time "t2".

The manager previously determines such setting information 212, connects the management terminal 40 to the operational switch 10 logically or physically to login and connects the portable module 20 to the operational switch 10. Then, the manager transmits, from the management terminal 40 to the operational switch 10, a deletion request for deleting the connection information held in the first holding unit 210, and transmits a setting request of the determined setting information 212 into the first holding unit 210. As described above, the connection information setting unit 620 deletes, from the first holding unit 210, the connection information according to the deletion request input from the management terminal 40. The setting information setting unit 622 writes the setting information on the portable module 20 according to the setting request input from the management terminal 40.

When the writing of the setting information 212 by the setting information setting unit 622 is completed, the manager may separate the management terminal 40 from the operational switch 10. When the setting information 212 is written, the portable module 20 may be separated from the operational switch 10. Furthermore, the manager transmits the setting information 212 determined as described above to the maintenance person, and delivers the portable module 20 where the setting information 212 is set to, for example, the maintenance person.

A terminal information setting unit 624 writes the terminal information 214 on the first holding unit 210 of the portable module 20 through the port management unit 610.

As illustrated in FIG. 6, the terminal information 214 can include information that identifies the maintenance terminal 30 to be connected to the portable module 20. For example, for the terminal information 214, the MAC address that is an example of the information which identifies the maintenance terminal 30 is set. As an example, the terminal information 214 illustrated in FIG. 6 includes a MAC address "aa:bb:cc:dd:ee:ff" of the maintenance terminal 30 to be connected to the operational switch 10.

When the portable module 20 and the maintenance terminal 30 are connected to the operational switch 10, the MAC address of the maintenance terminal 30 is acquired by the port management unit 610, and is outputted to the terminal information setting unit 624. The terminal information setting unit 624 writes the terminal information 214 inputted as described above on the portable module 20.

In other words, in a state where the portable module 20 is connected to the setting switch 60 and the maintenance terminal 30 is connected to the portable module 20, the port management unit 610 acquires the identification information on the maintenance terminal 30 from the maintenance terminal 30 through the portable module 20. Then, the terminal information setting unit 624 sets, for the first holding unit 210, the identification information on the maintenance terminal 30 acquired as described above by the port management unit 610.

When the writing of the terminal information 214 on the first holding unit 210 is completed, the port management unit 610 may provide a notification of the completion of the writing to the maintenance person or the like who connects the maintenance terminal 30 to the portable module 20. As the notification method, for example, there are known various methods such as one of turning on a system Light Emitting Diode (LED) corresponding to the port 11 to which the portable module 20 is connected.

When the writing of the terminal information 214 on the first holding unit 210 is completed, the maintenance person or the like may remove the maintenance terminal 30 from the portable module 20 or may remove the portable module 20 from the operational switch 10.

Figure 20:
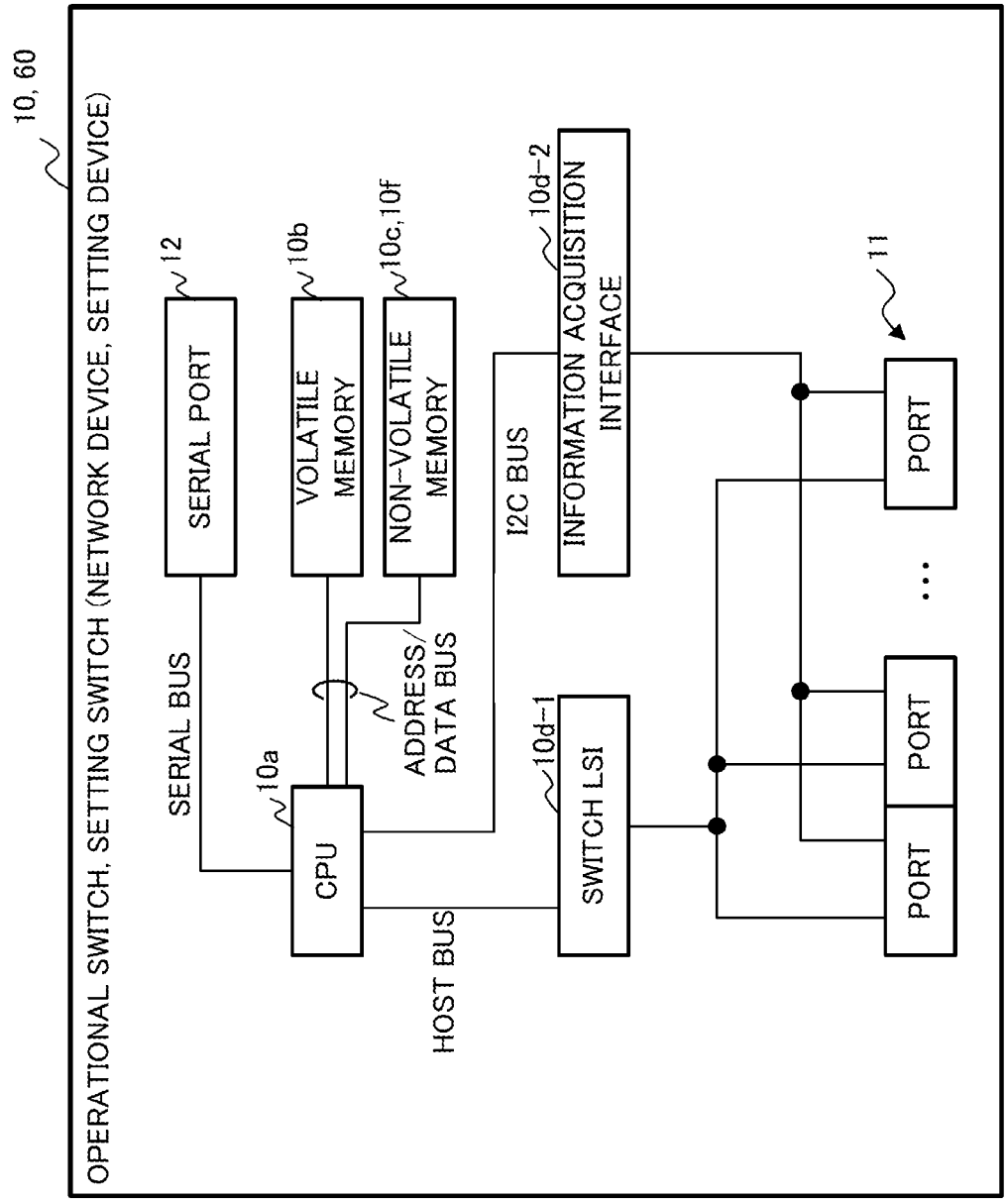
FIG. 20 is a diagram illustrating an example of the connection of the hardware illustrated in FIG. 19.
Figure 21:
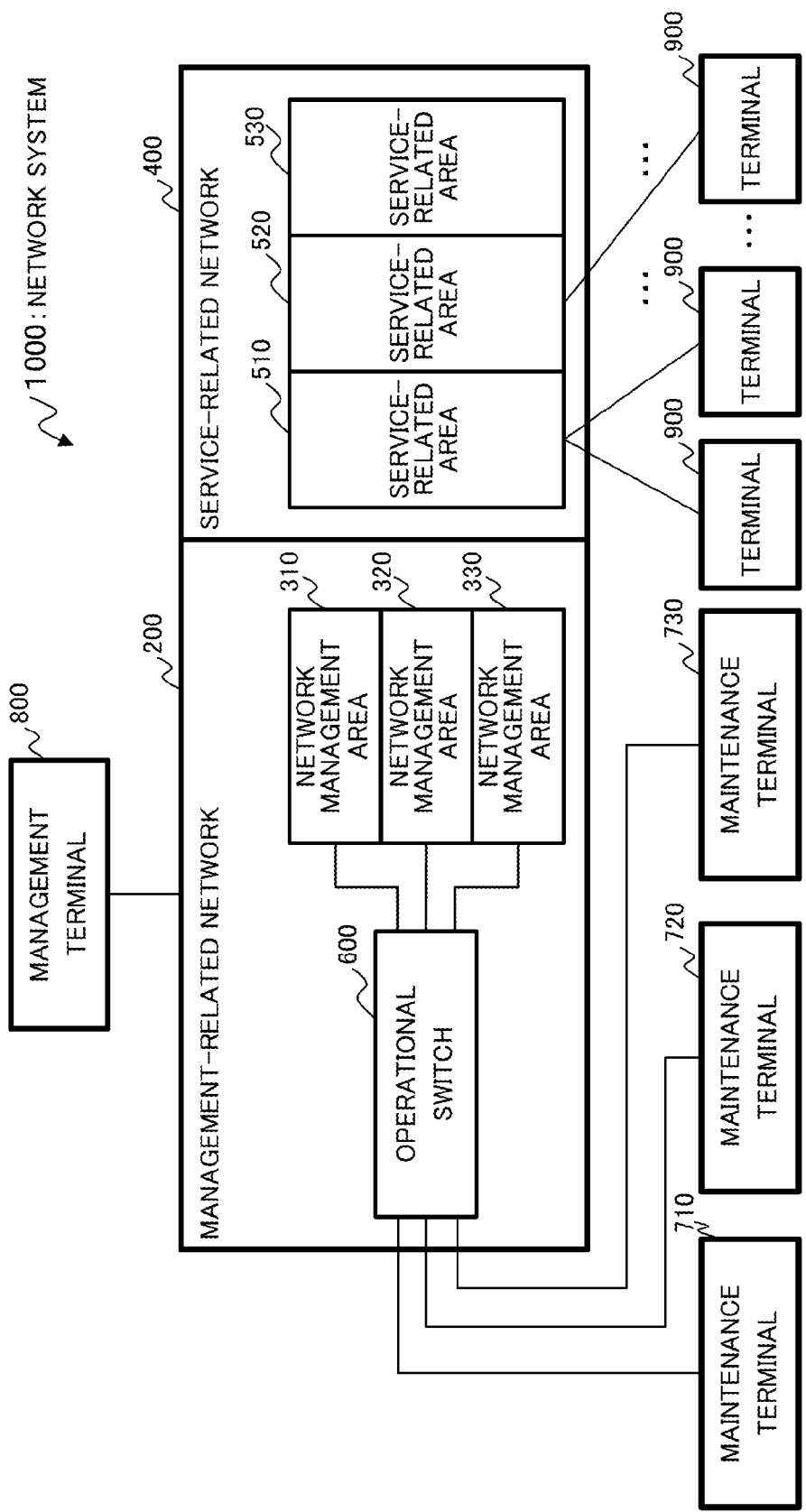
FIG. 21 is a diagram illustrating an example of the configuration of the network system.

The connection information setting unit 620 (the port management unit 610) can write and delete the connection information on and from the portable module 20 described above by using an information acquisition interface 10*d*-2 (see FIG. 20). Here, the information acquisition interface 10*d*-2 is an interface such as Inter Integrated Circuit (I2C) (registered trademark) that reads and writes data from and on the device connected to the port 11.

As described above, with the setting switch 60 and the portable module 20 according to the embodiment, the terminal information 214 on the maintenance terminal 30 connected to the portable module 20 is acquired by the setting switch 60. Hence, the manager does not need to previously acquire and register the MAC address of the maintenance terminal 30 on the portable module 20, and can reduce the occurrence of an increase in the number of operation steps, a setting error or the like even if there are a large number of maintenance terminals 30 that perform the operation.

[1-3] Detailed Description of the Network System

Figure 7:
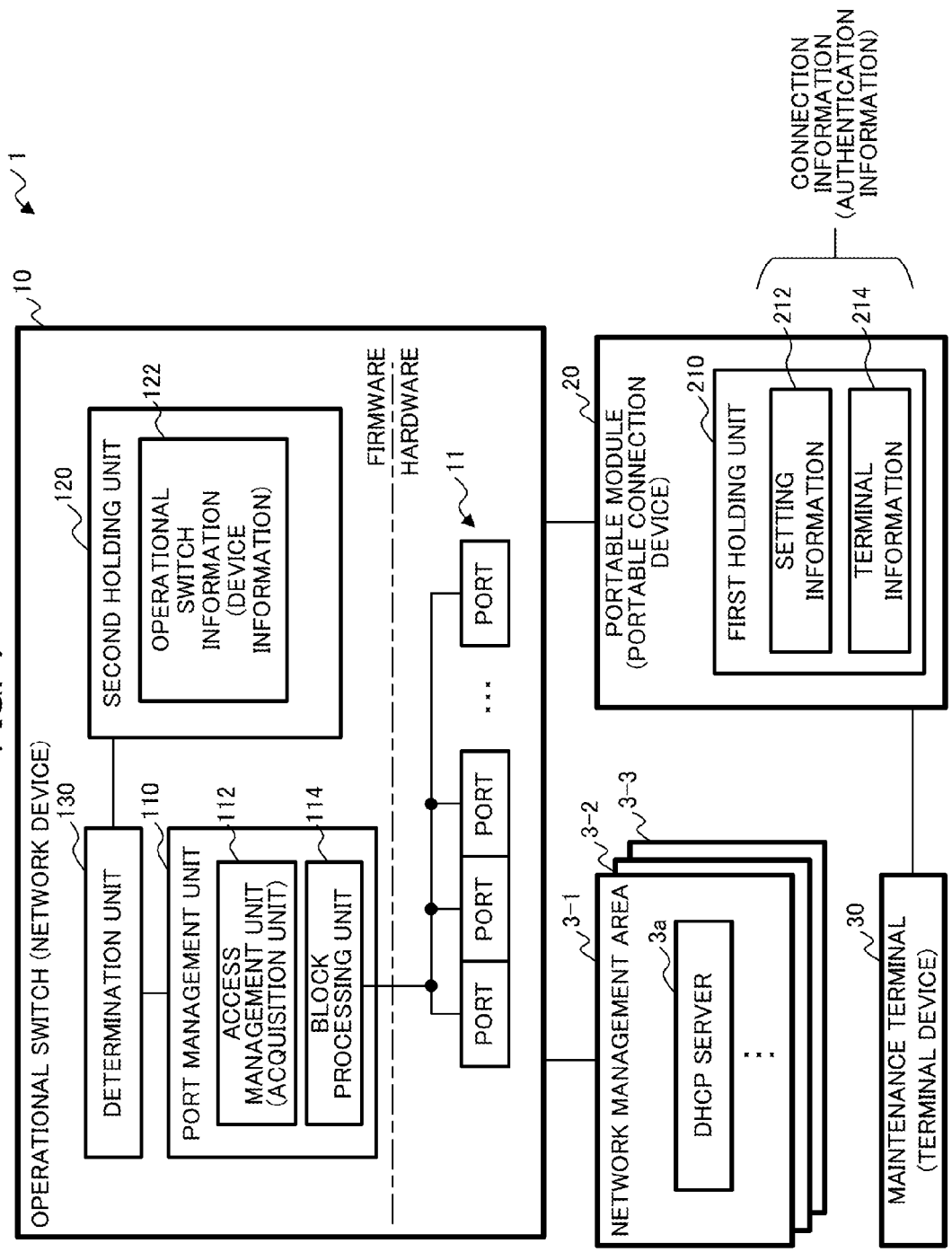
FIG. 7 is a diagram illustrating an example of the detailed configuration of the network system illustrated in FIG. 1.

The network system 1 illustrated in FIG. 1 will then be described in detail with reference to FIGS. 7 and 8. FIG. 7 is a diagram illustrating an example of the detailed configuration of the network system 1 illustrated in FIG. 1, and FIG. 8 is a diagram illustrating an example of operational switch information 122 held by the operational switch 10 illustrated in FIG. 7.

Although in FIG. 7, an example where the portable module 20 is connected to the operational switch 10 is described, the connection and removal of the portable module 20 to and from the operational switch 10 can be performed as appropriate. Likewise, although in FIG. 7, an example where the maintenance terminal 30 is connected to the portable module 20 is described, the connection and removal of the maintenance terminal 30 to and from the portable module 20 can be performed as appropriate.

As illustrated in FIG. 7, the operational switch 10 can include a port management unit 110, a second holding unit 120 and a determination unit 130. The port management unit 110 and the determination unit 130 are realized by, for example, a processor that performs the firmware of the operational switch 10. The second holding unit 120 is realized by a non-volatile memory such as a Random Access Memory (RAM). Alternatively, the second holding unit 120 may be realized by a magnetic disk device such as a Hard Disk Drive (HDD), a semiconductor drive device such as a Solid State Drive (SSD) or a non-volatile memory such as a flash memory.

The port management unit 110 detects the connection to the portable module 20 or the maintenance terminal 30, and manages access from the portable module 20 or the maintenance terminal 30. The port management unit 110 also can manage the port 11. For example, the port management unit 110 can include an access management unit 112 and a block processing unit 114.

The access management unit 112 can detect that the portable module 20 is connected to the port 11 (port 11*b*), and read data from the first holding unit 210 of the portable module 20. For example, the access management unit 112 can read the setting information 212 and the terminal information 214 from the first holding unit 210 of the portable module 20, and output them to the determination unit 130.

Furthermore, as with the port management unit 610, the access management unit 112 can detect, based on the access (for example, the ARP request) from the maintenance terminal 30, that the maintenance terminal 30 is connected to the portable module 20 connected to the port 11. The access management unit 112 can return, for the ARP request from the maintenance terminal 30, the ARP response to link-up the communication with the maintenance terminal 30, acquire the MAC address of the maintenance terminal 30 included in the ARP request and output it to the determination unit 130.

In other words, the access management unit 112 can be said to be an example of the acquisition unit that acquires the connection information (the setting information 212) held by the portable module 20 according to the connection of the portable module 20 to the operational switch 10. The access management unit 112 can be said to be an example of the acquisition unit that acquires the identification information on the maintenance terminal 30 from the maintenance terminal 30 according to the connection of the maintenance terminal 30 to the portable module 20.

The block processing unit 114 can block the port 11 to which the portable module 20 is connected according to the result of the determination by the determination unit 130. For example, when the determination unit 130 determines that the access from the maintenance terminal 30 is rejected to provide an instruction to block the port 11b, the block processing unit 114 downlinks the port 11b indicated by the instruction. The block processing unit 114 can perform the block processing on the port 11 by using an interface such as a switch Large Scale Integration (LSI) 10d-1 (see FIG. 20) that controls the switching of the port 11.

The second holding unit 120 can hold the operational switch information 122 on the device itself.

As illustrated in FIG. 8, the operational switch information (device information) 122 can include information on the connection position of the portable module 20 connected to the operational switch 10. For example, for the operational switch information 122, an operational switch serial number that is an example of information which identifies the operational switch 10, an operational switch port number that is an example of information which identifies the connection position to which the portable module 20 is connected and the current time are set. For the current time, a time that is indicated by a timer or a clock (not illustrated) included in the operational switch 10, a time that is received from an unillustrated Network Time Protocol (NTP) server or the like may be set. The current time may be data itself that indicates the time or information for identifying the place where the current time is stored, such as an address where the data is stored. In the following description, these are collectively referred to simply as the "current time".

As an example, the operational switch information 122 illustrated in FIG. 8 includes information indicating that at least one port 11 (port 11b) of the operational switch port number "10" in the operational switch serial number "xxxxxx" can be utilized. The operational switch information 122 includes information indicating that the current time is "hh" hour, "mm" minute and "ss" second on "yyyy" year, "mm" month and "dd" date.

The operational switch 10 can update such operational switch information 122 at predetermined timing and manage it. For example, when the operational switch 10 detects that the portable module 20 is connected through the access management unit 112 to the port 11, the operational switch 10 can set the number of the detected port 11 at the operational switch port number of the operational switch information 122.

The determination unit 130 can determine whether or not to allow the access from the maintenance terminal 30 based on the setting information 212 and the terminal information 214 held by the first holding unit 210, the operational switch information 122 held by the second holding unit 120 and the identification information on the terminal acquired from the maintenance terminal 30.

Specifically, the determination unit 130 performs determinations (i) to (iv) below.

(i) A determination is made as to whether or not the operational switch serial number of the setting information 212 agrees with the operational switch serial number of the operational switch information 122.

(ii) A determination is made as to whether or not the usage period of the setting information 212 includes the current time of the operational switch information 122, that is, whether or not the current time is present between the starting time and the ending time in the usage period.

(iii) A determination is made as to whether or not the connection port number (connection candidate position) of the setting information 212 agrees with the operational switch port number (actual connection position) of the operational switch information 122. When a plurality of connection port numbers are set for the setting information 212, a determination is made as to whether or not any one of the connection port numbers among the plurality of connection port numbers agrees with the operation switch port number of the operational switch information 122.

(iv) A determination is made as to whether or not the MAC address of the terminal information 214 agrees with the MAC address of the acquired maintenance terminal 30.

When the results of the determinations (i) to (iv) described above are all "positive", since the operational switch 10, the port 11 (port 11b), the maintenance terminal 30 and the usage period are all as previously determined, the determination unit 130 can allow the access from the maintenance terminal 30. In this case, the determination unit 130 can determine that the link of the port 11b is continued.

When the determination unit 130 determines that the link of the port 11b is continued, the operational switch 10 can switch the network management area 3 that the maintenance terminal 30 connected to the portable module 20 is allowed to access according to the connection port (connection position). In this way, since the operational switch 10 can allow the maintenance terminal 30 to access only the network management area 3 corresponding to the connection port, the manager can acquire security by previously and simply setting the connection candidate position.

At this time, the maintenance terminal 30 can acquire an Internet Protocol (IP) address and access the corresponding network management area 3 through the connection port 11b.

Here, when in the LAN setting of the maintenance terminal 30, the automatic acquisition of the IP address is set, the maintenance terminal 30 broadcasts a Dynamic Host Configuration Protocol (DHCP) request. The DHCP request is received by a DHCP server 3a in the network management area 3 corresponding to the connection port 11b, and the DHCP server 3a distributes the IP address to the maintenance terminal 30. As illustrated in FIG. 7, the network management area 3 can include at least the DHCP server 3a, and include various types of servers for managing the corresponding operation system area 5.

On the other hand, when among the results of the determinations (i) to (iv) described above, at least one is "negative", at least one of the operational switch 10, the port 11 (port 11b), the maintenance terminal 30 and the usage period violates the previously determined condition. In this case, the determination unit 130 can prevent (reject) the access from the maintenance terminal 30. For example, the determination unit 130 can instruct the block processing unit 114 to block the port 11b to which the portable module 20 (the maintenance terminal 30) is connected. In this way, it is possible to prevent the maintenance person (the maintenance terminal 30) from accessing the operational switch 10 unexpectedly of the manager, and therefore maintain the security of the network system 1.

As described above, the determination unit 130 compares the connection information acquired by the access management unit 112 with the identification information on the maintenance terminal 30 and operational switch information 122 on the operational switch 10, and thereby determines whether or not to allow the access from the maintenance terminal 30.

As described above, the network system 1 according to the embodiment compares the terminal information 214 on the maintenance terminal 30 for the maintenance person written by the setting switch 60 of the setting system 6 on the portable module 20 with the identification information on the maintenance terminal 30 connected to the operational switch 10. Then, the access authentication on the maintenance terminal 30 is performed by the results of the comparison. As described above, since in the operational switch 10, it is possible to automatically perform the port security setting, the manager does not need to previously check and register the identification information on the maintenance terminal 30 in the operational switch 10. Hence it is possible to acquire security of the operational switch 10 while simplifying the addition/deletion processing on the operational switch 10 by the manager (the management terminal 40).

As described above, in the port protect function, since in order for the security setting information to be moved for each port, a MAC address is newly registered for the port to which the security setting information is moved, it is difficult to set security information at a plurality of (for example, multiple) ports.

On the other hand, in the network system 1 according to the embodiment, it is possible to set, for the setting information 212, a plurality of connection port numbers of the operational switch 10 to which the portable module 20 (the maintenance terminal 30) is connected. Hence, the maintenance person can connect the portable module 20 to an arbitrary port 11 within the range of the connection port numbers that are set. In this way, even when the portable module 20 (the maintenance terminal 30) is connected to any of a plurality of ports 11 in the operational switch 10, the manager may set a plurality of connection port numbers as the setting information 212, and does not need to make a setting for each port 11. Hence, it is possible to reduce the occurrence of an increase in the number of operation steps, a setting error and the like.

Figure 9:
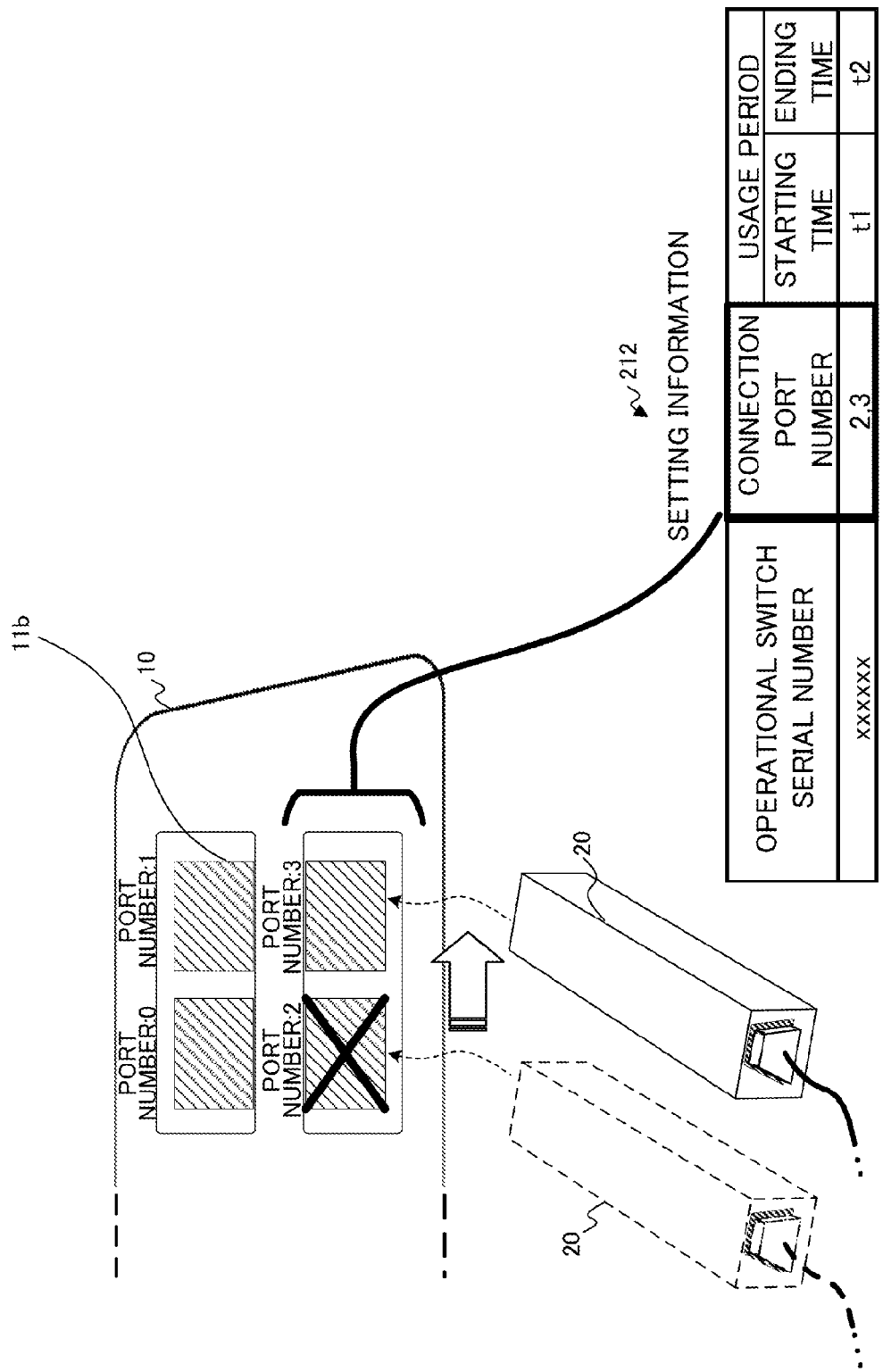
FIG. 9 is a diagram illustrating an example of the failure of a port in the operational switch.

FIG. 9 is a diagram illustrating an example of the failure of the port 11b in the operational switch 10. As illustrated in FIG. 9, it is assumed that "2, 3" are set at the connection port numbers of the setting information 212 held by the portable module 20, and that the maintenance terminal 30 is connected to the port 11b of the port number "2". Here, even when the port 11b of the port number "2" in the operational switch 10 fails, the maintenance person may reconnect the portable module 20 to the other port 11b of the port number "3". Hence, with the network system 1 according to the embodiment, it is possible to acquire security of the operational switch 10, to reduce the increase in the number of operation steps and to provide redundancy to the port 11 of the operational switch 10 to which the maintenance terminal 30 is connected.

Figure 10:
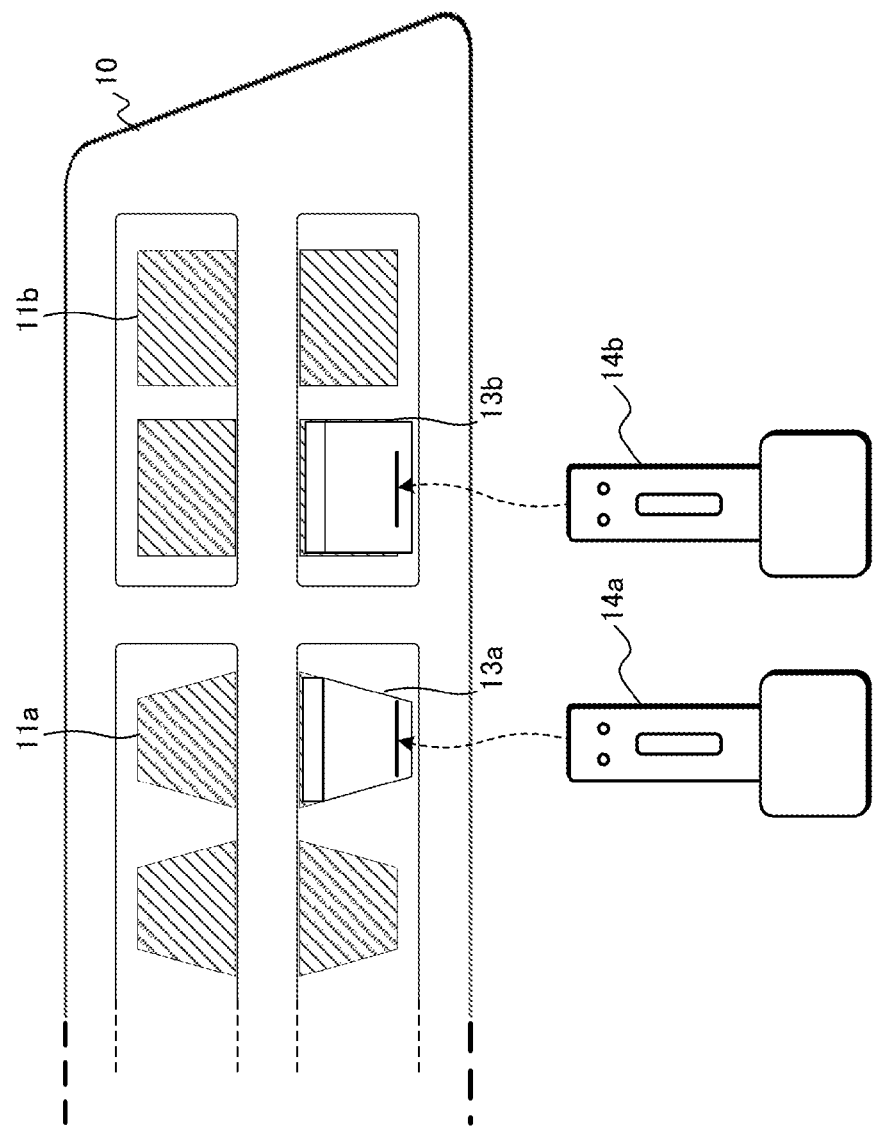
FIG. 10 is a diagram illustrating an example where security locks are provided in the ports of the operational switch.

FIG. 10 is a diagram illustrating an example where security locks 13a and 13b are provided in the port 11 of the operational switch 10. As illustrated in FIG. 10, in a method of attaching the security locks 13a and 13b to the ports 11a and 11b, respectively, as described above, it is complicated to manage security keys 14a and 14b. When the security keys 14a and 14b are lost, it may be difficult to release the security locks.

On the other hand, with the network system 1 according to the embodiment, it is possible to acquire security without using the security locks 13a and 13b, and to reduce the maintenance cost since it is not necessary to manage the security keys 14a and 14b.

[1-4] Example of the Operation of the Network System and the Setting System

An example of the operation of the network system 1 and the setting system 6 configured as described above will then be described with reference to FIGS. 11 to 18.

[1-4-1] Example of the Entire Operation

Figure 11:
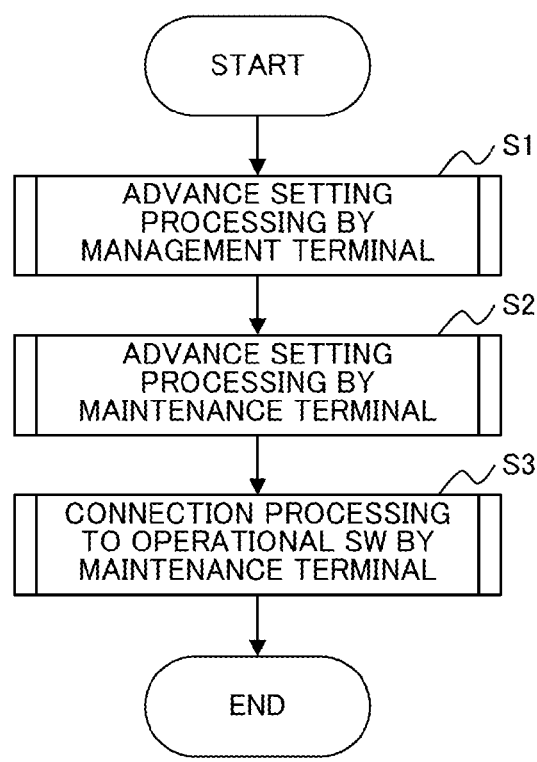
FIG. 11 is a flowchart illustrating an example of the entire operation of the network system and the setting system.

An example of the entire operation of the network system 1 and the setting system 6 will first be described with reference to FIG. 11. FIG. 11 is a flowchart illustrating the example of the entire operation of the network system 1 and the setting system 6.

As illustrated in FIG. 11, advance setting processing is first performed by the management terminal 40 (step S1). In the advance setting processing by the management terminal 40, the management terminal 40 uses the setting switch 60 to set the portable module 20.

Then, the advance setting processing by the maintenance terminal 30 is performed (step S2). In the advance setting processing by the maintenance terminal 30, the maintenance terminal 30 uses the setting switch 60 to set the portable module 20.

After the completion of the advance setting processing, the portable module 20 is inserted into the operational switch 10, and the maintenance terminal 30 is connected to the portable module 20. Then, connection processing to the operational switch 10 by the maintenance terminal 30 is performed (step S3), and the processing is completed.

Figure 12:
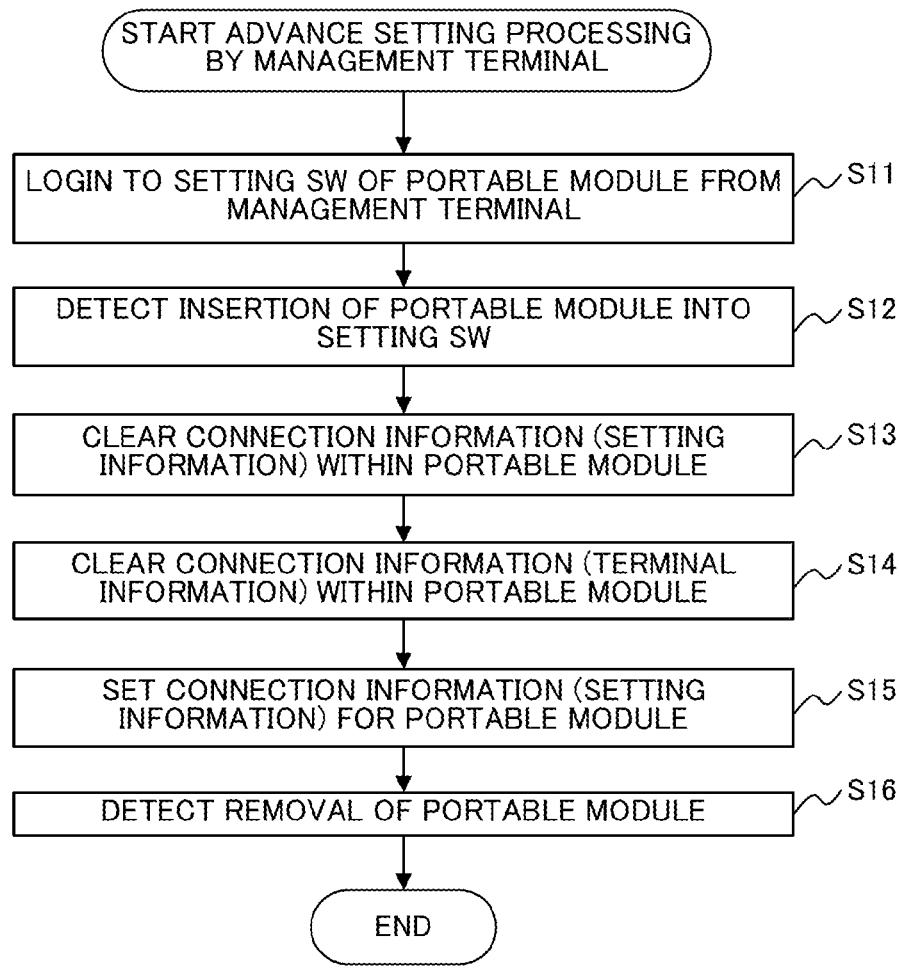
FIG. 12 is a flowchart illustrating an example of the operation of advance setting processing by a management terminal.
Figure 14:
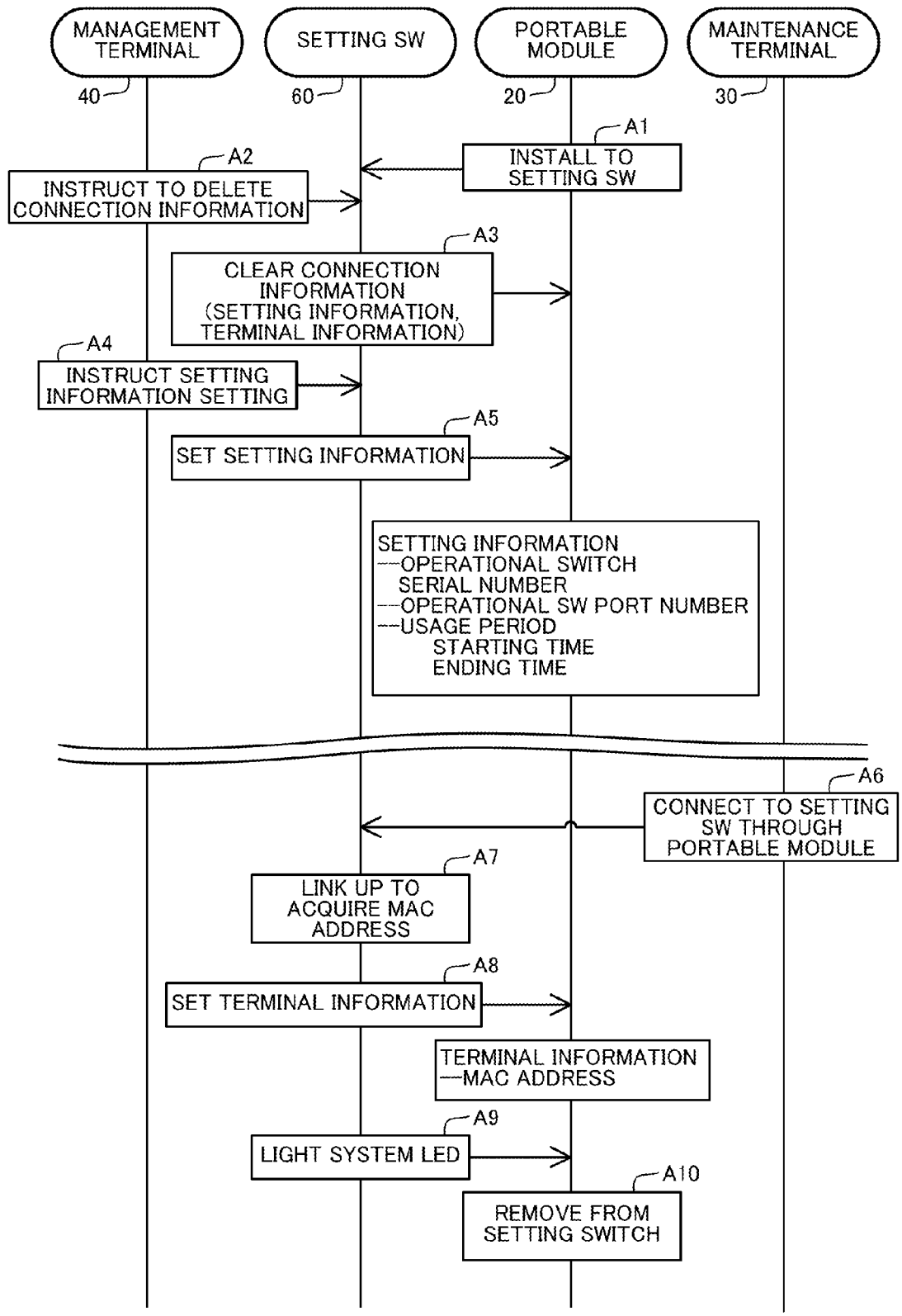
FIG. 14 is a sequence diagram illustrating the example of the operation of the advance setting processing.
Figure 15:
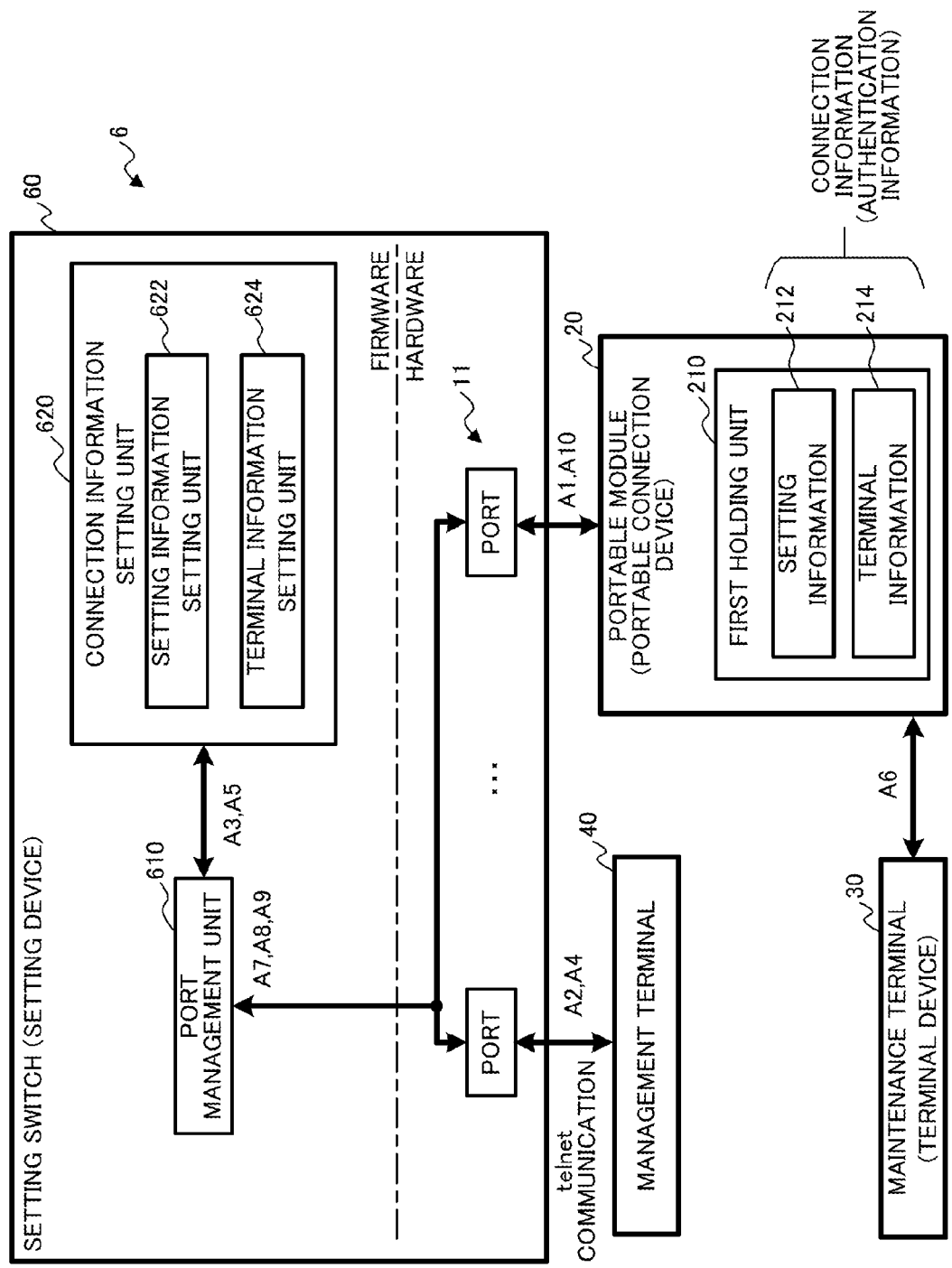
FIG. 15 is a diagram illustrating the example of the operation of the advance setting processing.

[1-4-2] Example of the Operation of the Advance Setting Processing by the Management Terminal An example of the operation of the advance setting processing by the management terminal 40 will then be described with reference to FIGS. 12, 14 and 15. FIG. 12 is a flowchart illustrating an example of the operation of the advance setting processing by the management terminal 40. FIG. 14 is a sequence diagram illustrating the example of the advance setting processing, and FIG. 15 is a diagram illustrating the example of the operation of the advance setting processing. A description will be given below along the flowchart of FIG. 12.

First, as illustrated in FIG. 12, a telnet or the like is used to login to the setting switch 60 by the management terminal 40 (step S11). When the manager logins to the setting switch 60, the manager inserts the portable module 20 into the port 11b of the setting switch (see processing A1 in FIGS. 14 and 15). In the port management unit 610 of the setting switch 60, the insertion of the portable module 20 into the port 11b is detected (step S12).

Then, the manager provides a notification of an instruction to delete the connection information (the setting information 212 and the terminal information 214) set for the portable module 20 from the management terminal 40 to the setting switch 60 (see processing A2 in FIGS. 14 and 15). In the setting switch 60, the connection information setting unit 620 deletes the setting information 212 and the terminal information 214 according to the deletion instruction (steps S13 and S14, and the processing A3 in FIGS. 14 and 15).

Then, the manager provides a notification of an instruction to set new connection information (the setting information 212) from the management terminal 40 to the setting switch 60 (see processing A4 in FIGS. 14 and 15). In the setting switch 60, the setting information setting unit 622 writes the new setting information 212 according to the setting instruction on the first holding unit 210 of the portable module 20 (step S15, and the processing A5 in FIGS. 14 and 15). The portable module 20 is removed from the setting switch 60, and the removal of the portable module 20 is detected by the port management unit 610 (step S16).

The manager provides, to the maintenance person, the setting information 212, the information (for example, the serial number) on the portable module 20 used (set), a procedure for the advance setting and the like. The order of the processing in steps S13 and S14 may be reversed.

In this way, the advance setting processing by the management terminal 40 is completed.

Figure 13:
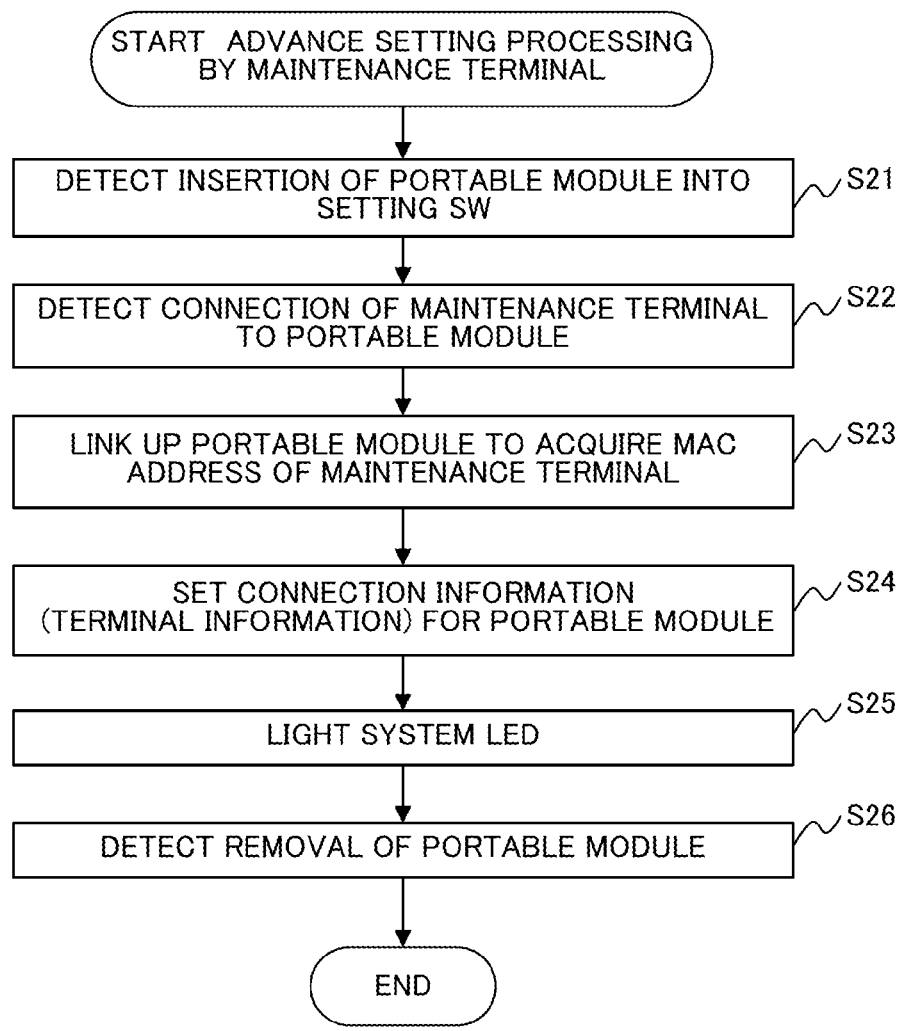
FIG. 13 is a flowchart illustrating an example of the operation of advance setting processing by a maintenance terminal.

[1-4-3] Example of the Operation of the Advance Setting Processing by the Maintenance Terminal An example of the operation of the advance setting processing by the maintenance terminal 30 will then be described with reference to FIGS. 13 to 15. FIG. 13 is a flowchart illustrating an example of the operation of the advance setting processing by the maintenance terminal 30.

The maintenance person checks the portable module 20 indicated by the manager, and connects the maintenance terminal 30 to be connected by the maintenance person to the portable module 20. In the port management unit 610 of the setting switch 60, the connection of the portable module 20 to the setting switch 60 is detected (step S21). Then, the maintenance person connects the maintenance terminal 30 to the portable module 20, and thereby connects the maintenance terminal 30 to the setting switch 60 through the portable module 20 inserted into the setting switch 60 (see processing A6 in FIGS. 14 and 15). In the port management unit 610 of the setting switch 60, the connection of the maintenance terminal 30 to the portable module 20 is detected (step S22).

Then, the port management unit 610 link-ups the portable module 20 (the maintenance terminal 30), and acquires the MAC address of the maintenance terminal 30 (see step S23 and the processing A7 in FIGS. 14 and 15). Due to the link-up, the terminal information setting unit 624 writes the acquired MAC address, as the connection information (the terminal information 214), on the first holding unit 210 of the portable module 20 (see step S24 and the processing A8 in FIGS. 14 and 15).

When the setting of the terminal information 214 is completed, the setting switch 60 turns on the system LED indicating the completion of the advance setting processing (see step S25 and the processing A9 in FIGS. 14 and 15). The portable module 20 is removed from the setting switch 60 (see the processing A10 in FIGS. 14 and 15), and the removal of the portable module 20 is detected by the port management unit 610 (step S26).

In this way, the advance setting processing by the maintenance terminal 30 is completed.

Figure 16:
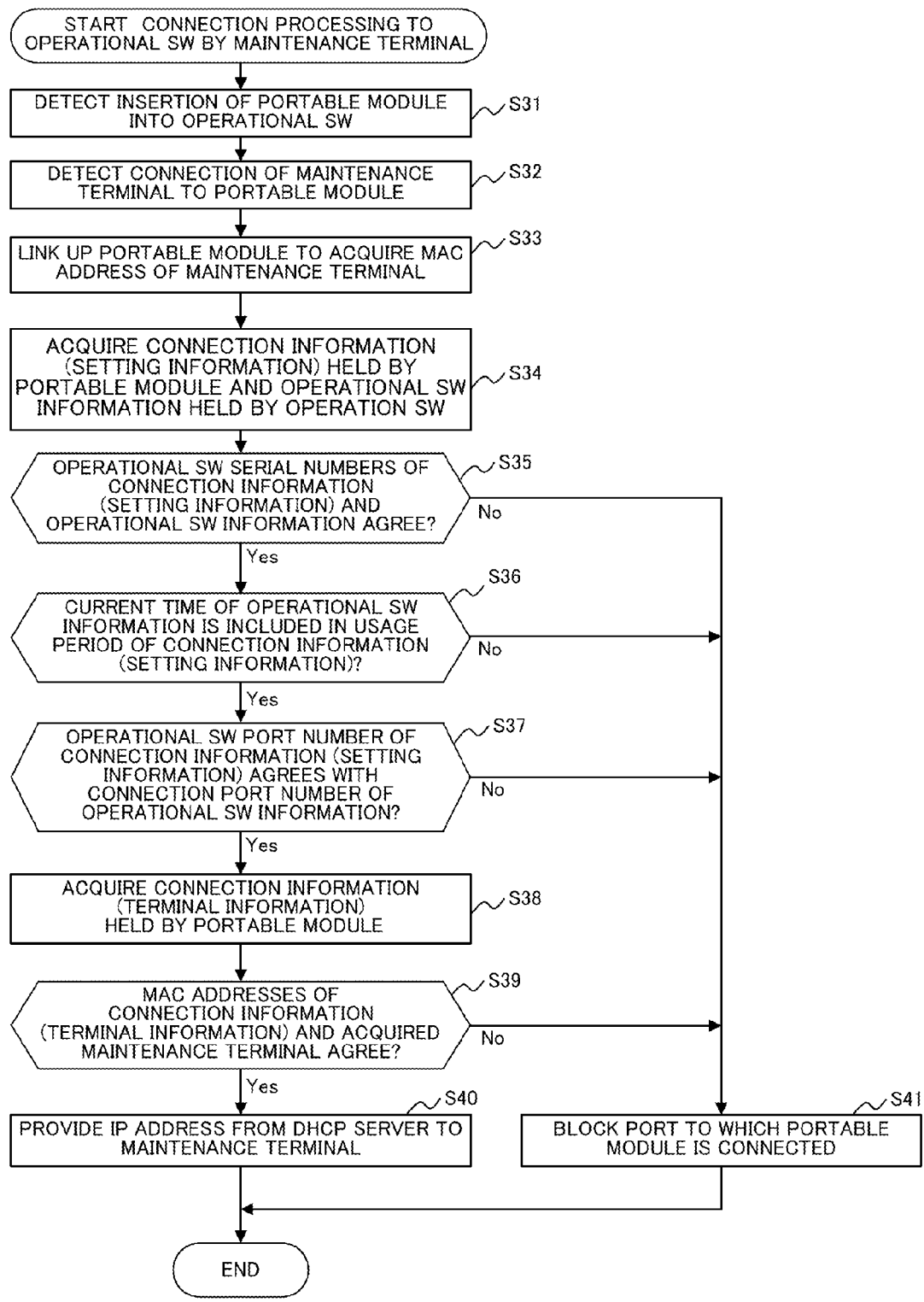
FIG. 16 is a flowchart illustrating an example of the operation of connection processing to the operational switch by the maintenance terminal.
Figure 17:
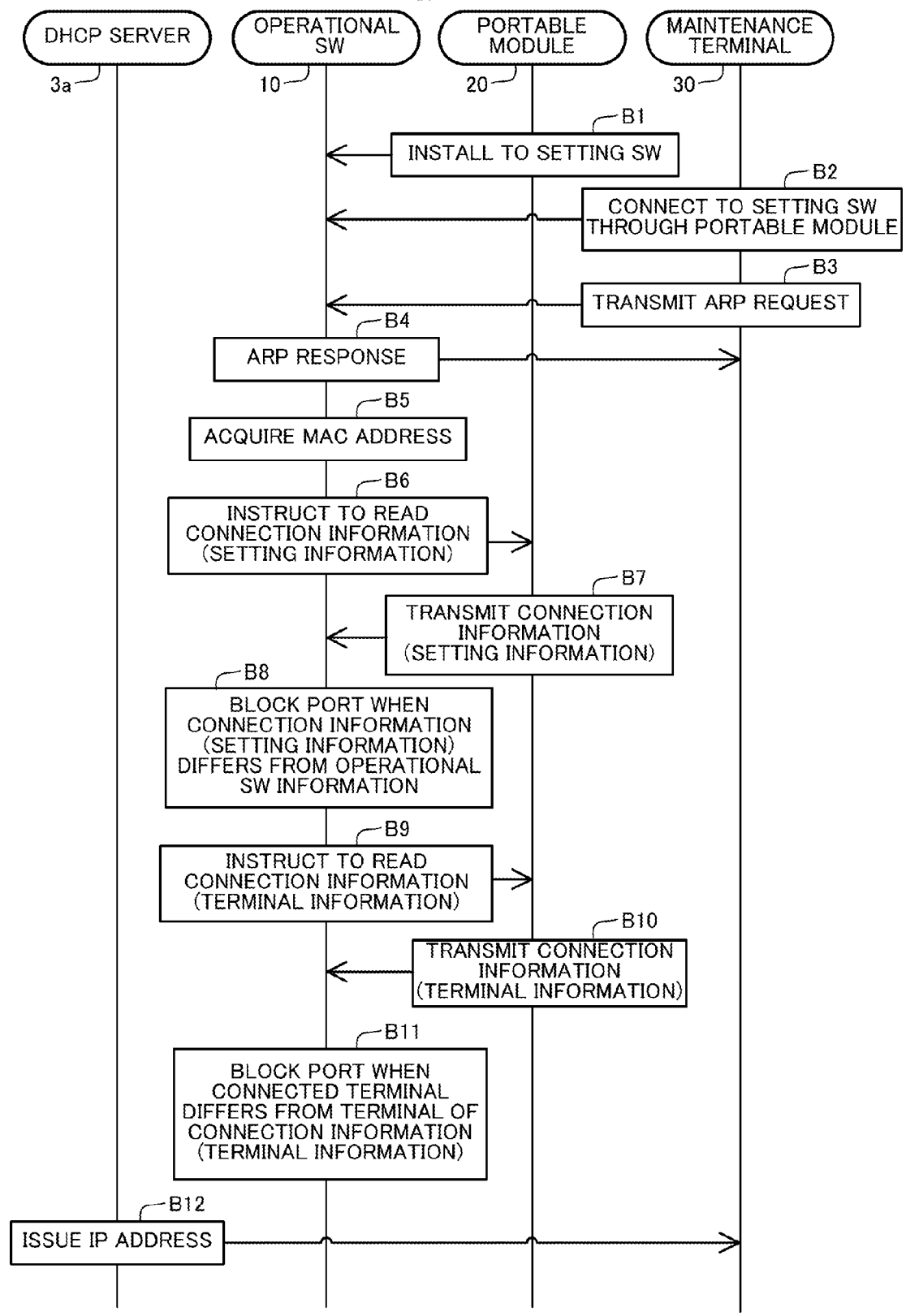
FIG. 17 is a sequence diagram illustrating the example of the operation of the connection processing.
Figure 18:
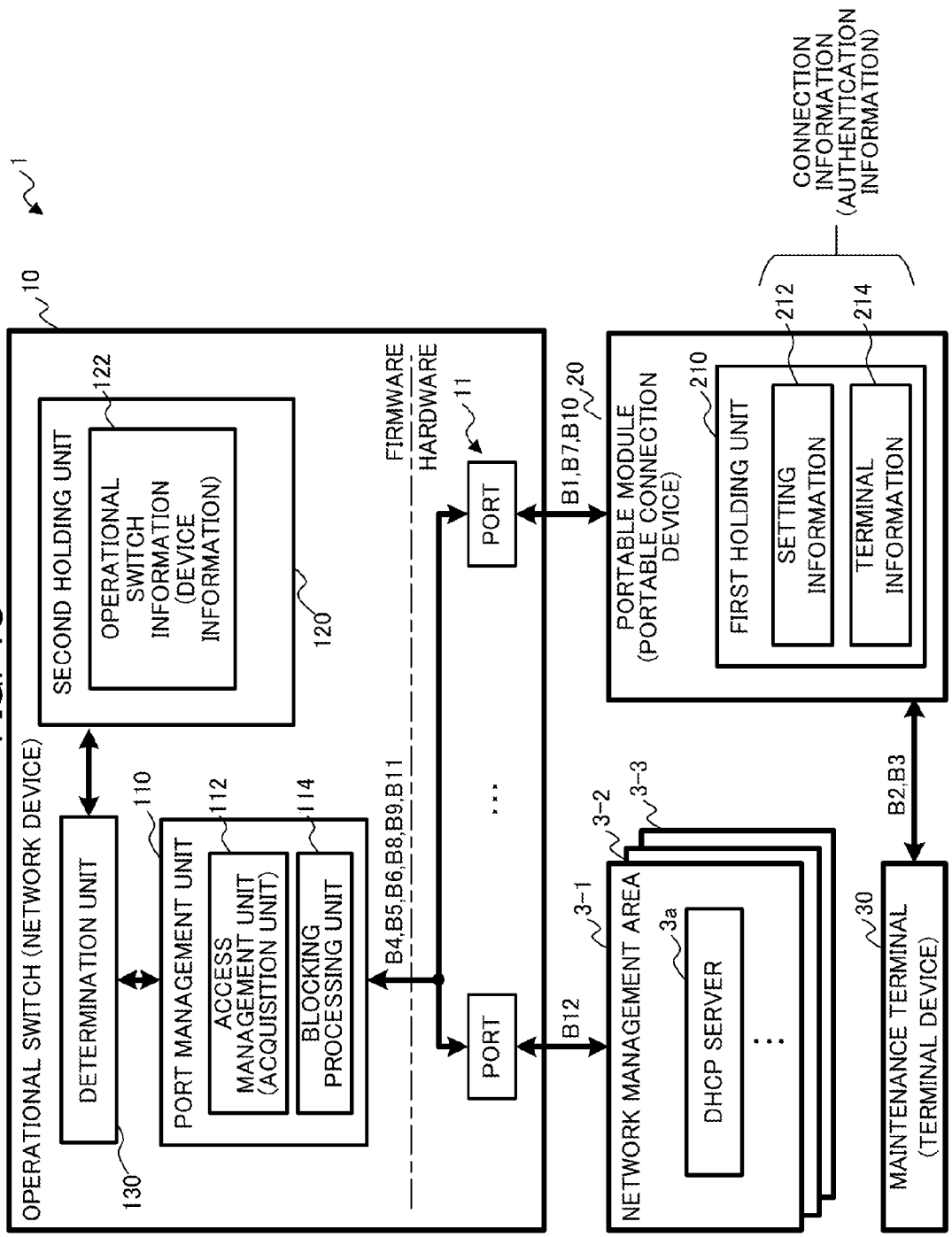
FIG. 18 is a diagram illustrating the example of the operation of the connection processing.

[1-4-4] Example of the Operation of the Connection Processing to the Operational Switch by the Maintenance Terminal An example of the operation of the connection processing to the operational switch 10 by the maintenance terminal 30 will then be described with reference to FIGS. 16 to 18. FIG. 16 is a flowchart illustrating the example of the operation of the connection processing to the operational switch 10 by the maintenance terminal 30. FIG. 17 is a sequence diagram illustrating the example of the operation of the connection processing, and FIG. 18 is a diagram illustrating the example of the operation of the connection processing. A description will be given below along the flowchart of FIG. 16.

First, the maintenance person inserts (mounts) the portable module 20 on the operational switch 10 (see processing B1 in FIGS. 17 and 18), and in the operational switch 10, the insertion of the portable module 20 is detected by the access management unit 112 (step S31). The maintenance person also connects the maintenance terminal 30 to the portable module 20 (see processing B2 in FIGS. 17 and 18), and in the operational switch 10, the connection of the maintenance terminal 30 is detected by the access management unit 112 (step S32).

Then, the access management unit 112 link-ups the portable module 20 (the maintenance terminal 30), and acquires the MAC address of the maintenance terminal 30 (step S33). Specifically, the maintenance terminal 30 transmits the APR request to the operational switch 10, and the access management unit 112 returns the ARP response to the ARP request and acquires the MAC address of the maintenance terminal 30 from the ARP request (see processing B3 to B5 in FIGS. 17 and 18).

Then, the access management unit 112 provides a notification of an instruction to read the connection information (the setting information 212) to the portable module 20, and the portable module 20 returns the connection information (the setting information 212) held in the first holding unit 210 (see processing B6 and B7 in FIGS. 17 and 18).

In the operational switch 10, the determination unit 130 acquires the setting information 212 from the portable module 20 and the operational switch information 122 held in the second holding unit 120 (step S34).

Then, the determination unit 130 determines whether or not the operational switch serial numbers of the setting information 212 and the operational switch information 122 agree with each other and whether or not the current time of the operational switch information 122 is included in the usage period of the setting information 212 (steps S35 and S36). The determination unit 130 also determines whether or not the operational switch port number of the setting information 212 and the connection port number of the operational switch information 122 agree with each other (step S37).

When in steps S35 to S37, the determinations are all "positive" (Yes route in steps S35 to S37), the processing is moved to step S38. On the other hand, when in steps S35 to S37, at least one of the determinations is "negative" (No route in steps S35 to S37), the determination unit 130 instructs the block processing unit 114 to block the port 11b to which the portable module (the maintenance terminal 30) is connected. In the block processing unit 114, the indicated port 11b is link-downed and blocked (see step S41 and the processing B8 in FIGS. 17 and 18), and the processing is completed.

In step S38, the determination unit 130 acquires the terminal information 214 from the portable module 20. Specifically, the access management unit 112 provides a notification of an instruction to read the connection information (the terminal information 214) to the portable module 20, and the portable module 20 returns the connection information (the terminal information 214) held in the first holding unit 210 (see the processings B9 and B10 in FIGS. 17 and 18).

Then, in the operational switch 10, the determination unit 130 determines whether or not the MAC address of the terminal information 214 and the MAC address acquired in step S33 agree with each other (step S39). When they do not agree with each other (No route in step S39), the processing is moved to step S41 (see the processing B11 in FIGS. 17 and 18). On the other hand, when they agree with each other (Yes route in step S39), an IP address is provided by the maintenance terminal 30 from the DHCP server 3a to the maintenance terminal 30 (see step S40 and the processing B12 in FIGS. 17 and 18).

In the processing in steps S33 to S39 (the processing B3 to B11 in FIGS. 17 and 18), the processing order of the acquisition of the MAC address of the setting information 212, the terminal information 214, the operational switch information 122 and the maintenance terminal 30 by the determination unit 130 may be changed. The processing order in the determination process in steps S35 to S39 may be changed.

In this way, the connection processing to the operational switch 10 by the maintenance terminal 30 is completed.

[2] Hardware Configuration of the Operational Switch and the Setting Switch

Figure 19:
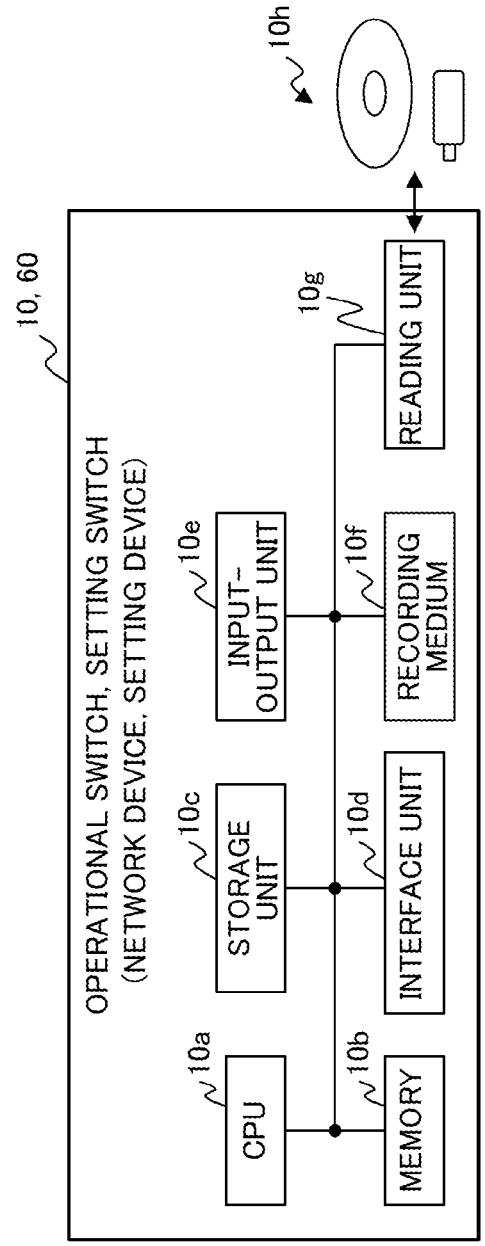
FIG. 19 is a diagram illustrating an example of the hardware configuration of the operational switch illustrated in FIG. 1 and the setting switch illustrated in FIG. 3.

An example of the hardware configuration of the operational switch 10 and the setting switch 60 according to the embodiment will then be described with reference to FIG. 19. FIG. 19 is a diagram illustrating the example of the hardware configuration of the operational switch 10 illustrated in FIG. 1 and the setting switch 60 illustrated in FIG. 3, and FIG. 20 is a diagram illustrating an example of the connection in the hardware illustrated in FIG. 19.

The network device serving as each of the operational switch 10 and the setting switch 60 can include, as illustrated in FIG. 19, a Central Processing Unit (CPU) 10a, a memory 10b, a storage unit 10c, an interface unit 10d and an input-output unit 10e. Furthermore, the network device serving as each of the operational switch 10 and the setting switch 60 can include a recording medium 10f and a reading unit 10g.

The CPU 10a is an arithmetic processing unit (processor) that is connected to the corresponding blocks 10a to 10g illustrated in FIG. 19 and performs various types of control and computation. The CPU 10a executes programs stored in the memory 10b, the storage unit 10c, the recording media 10f and 10h, an unillustrated Read Only Memory (ROM) or the like, and thereby can realize various types of functions in the operational switch 10 or the setting switch 60. Instead of the CPU 10a, as the processor, an electronic circuit such as a Micro Processing Unit (MPU) or the like may be used.

The memory 10b is a storage device that stores various types of data and programs. When the CPU 10a executes a program, the CPU 10a stores data and the program in the memory 10b and expands them. As the memory 10b, for example, there is a non-volatile memory such as a RAM.

The storage unit 10c is hardware that stores various types of data, programs and the like. Examples of the storage unit 10c include various types of devices such as a magnetic disk device such as a HDD, a semiconductor drive device such as a SSD and a non-volatile memory such as a flash memory.

The interface unit 10d performs control on wired or wireless connection and communication with a network (in the case of the operational switch 10, the management-related network 2), the management terminal 40 or the portable module 20 (the maintenance terminal 30). The interface unit 10d may include, as illustrated in FIG. 20, a switch LSI 10d-1, an information acquisition interface 10d-2, a port 11 and a serial port 12.

The input-output unit 10e can include at least one of an input device such as a mouse or a keyboard and an output device such as a display or a printer. For example, the input-output unit 10e is used for various types of operations on the operational switch 10 or the setting switch 60 by a user (a manager or a maintenance person) or the like. When the maintenance terminal 30 or the management terminal 40 is connected through the interface unit 10d (the port 11 or the serial port 12) to the operational switch 10 or the setting switch 60, the input-output unit 10e may be omitted.

The recording medium 10f is, for example, a storage device such as a flash memory or a ROM, and can record various types of data and programs. The reading unit 10g is a device that reads data and programs recorded in the (non-transitory) computer-readable recording medium 10h. In at least one of the recording medium 10f and 10h, a control program (firmware) that realizes the whole or part of various types of functions of the operational switch 10 or the setting switch 60 according to the embodiment may be stored. For example, the CPU 10a can expand and execute the program read from the recording medium 10f or the program read through the reading unit 10g from the recording medium 10h in the storage device such as the memory 10b. In this way, the computer (including the CPU 10a, the network device and various types of terminals) can realize the function of the operational switch 10 or the setting switch 60 described above.

Examples of the recording medium 10h include optical discs such as a flexible disk, a Compact Disc (CD), a Digital Versatile Disc (DVD) and a blue-ray disc and flash memories such as a USB memory and a SD card. Examples of the CD include a CD-ROM, a CD-Recordable (CD-R) and a CD-Rewritable (CD-RW). Examples of the DVD include a DVD-ROM, a DVD-RAM, a DVD-R, a DVD-RW, a DVD+R and a DVD+RW.

The blocks 10a to 10g described above are connected by buses such that they can communicate with each other. For example, as illustrated in FIG. 20, the CPU 10a, the memory 10b (volatile memory) and the storage unit 10c or the recording medium 10f (non-volatile memory) are connected through an address/data bus. The CPU 10a and the switch LSI 10d-1 are connected through a host bus, and the CPU 10a and the information acquisition interface 10d-2 are connected through, for example, an I2C bus. Furthermore, the CPU 10a and the serial port 12 are connected through a serial bus.

The hardware configuration of the operational switch 10 and the setting switch 60 described above is illustrative. Hence, it is possible to increase or decrease (for example, add or omit an arbitrary block), divide, arbitrarily combine and integrate the hardware within the operational switch 10 or the setting switch 60 or add or omit the bus as appropriate. Different hardware configurations may be adopted between the operational switch 10 and the setting switch 60.

[3] Others

Although the preferred embodiment of the present invention has been described in detail above, the present invention is not limited to the specific embodiment described above, and various variations and modifications are possible without departing from the spirit of the present invention.

For example, although in the embodiment, the portable module 20 is connected to the port 11b, it may be connected to the port 11a.

Although in the above description, one pair of the connection information (the setting information 212 and the terminal information 214) is held in the portable module 20, a plurality of pairs of connection information for a plurality of maintenance terminals 30 may be held. In this case, for each entry of the setting information 212, identification information such as the MAC address of the maintenance terminal 30 may be set. In this case, the management terminal 40 may omit at least part of, in the advance setting processing, the deletion processing on the connection information held in the first holding unit 210.

Furthermore, although in the description of the embodiment, attention is focused on one pair of the portable module 20 and the maintenance terminal 30 connected to the operational switch 10 and the setting switch 60, the same is true for the case where a plurality of pairs of the portable modules 20 and the maintenance terminals 30 are simultaneously connected to the operational switch 10 and the setting switch 60.

Although in the description of the embodiment, the operational switch 10, the setting switch 60 and the portable module 20 correspond to the Ethernet and the like, there is no limitation to this, and they may correspond to InfiniBand and the like. In this case, instead of the MAC address that is an example of the identification information on the maintenance terminal 30, Globally Unique Identifiers (GUID) is preferably used.

Furthermore, although in the description of the embodiment with reference to FIG. 19, the operational switch 10 and the setting switch 60 include the input-output unit 10e, the recording medium 10f and the reading unit 10g, there is no limitation to this configuration. For example, at least one of the input-output unit 10e, the recording medium 10f and the reading unit 10g may be included in the management terminal 40, the maintenance terminal 30 or another device. In this case, the control program may be transferred through wire or wireless from the management terminal 40, the maintenance terminal 30 or the other device to the operational switch 10 or the setting switch 60, and the CPU 10a may expand and execute the transferred control program in the memory 10b.

Although the network system 1 and the setting system 6 according to the embodiment have been described separately, this does not mean that the network system 1 and the setting system 6 are different systems. In other words, the setting system 6 (the setting switch 60) may be treated as part of the network system 1.

According to the embodiment, it is possible to easily acquire security when a network device is managed.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network system comprising:
a network device; and
a portable connection device to be connected thereto a terminal device which accesses the network device, the portable connection device holds authentication information related to the connection between the network device and the terminal device, the authentication information being previously set,
the network device includes a processor, and the processor
acquires the authentication information held in the portable connection device according to the connection of the portable connection device to the network device, and acquires identification information on the terminal device from the terminal device according to the connection of the terminal device to the portable connection device, and
compares the acquired authentication information with the identification information on the terminal device and device information on the network device to determine whether or not the access from the terminal device is allowed.

2. The network system according to claim 1, wherein the processor
compares setting information related to one or more connection candidate positions of the portable connection device to the network device included in the previously set authentication information with information related to a connection position of the portable connection device connected to the network device included in the device information, and
switches, when the connection position of the portable connection device is determined to coincide with the connection candidate position, a network that the terminal device connected to the portable connection device is allowed to access according to the connection position.

3. The network system according to claim 2, wherein the processor determines to prevent the access from the terminal device when the connection position of the portable connection device is different from the connection candidate position.

4. The network system according to claim 1, wherein the processor
compares terminal information that identifies the terminal device connected to the portable connection device included in the previously set authentication information with the acquired identification information on the terminal device, and
determines to prevent the access from the terminal device when the terminal information is different from the identification information.

5. The network system according to claim 4, wherein
the portable connection device holds the authentication information set by a setting device that sets the authentication information for the portable connection device, and
the terminal information included in the previously set authentication information is identification information on the terminal device acquired by the setting device through the portable connection device from the terminal device in a state where the portable connection device is connected to the setting device and the terminal device is connected to the portable connection device.

6. The network system according to claim 1, wherein
the network device further includes a plurality of ports to be connected thereto the portable connection device, and
the processor blocks the port to which the portable connection device is connected when the processor determines to prevent the access from the terminal device.

7. The network system according to claim 1, wherein the portable connection device is an adapter through which the terminal device connected to the portable connection device accesses the network device.

8. A network device accessed by a terminal device and is to be connected thereto a portable connection device to be connected thereto the terminal device, the network device comprising:
a processor; and a storage apparatus configured to store device information on the network device, the portable connection device holds authentication information related to the connection between the network device and the terminal device, the authentication information being previously set, and the processor acquires the authentication information held in the portable connection device according to the connection of the portable connection device to the network device, and acquires identification information on the terminal device from the terminal device according to the connection of the terminal device to the portable connection device, and compares the acquired authentication information with the identification information on the terminal device and the device information stored in the storage apparatus to determine whether or not the access from the terminal device is allowed.

9. The network device according to claim 8, wherein the processor compares setting information related to one or more connection candidate positions of the portable connection device to the network device included in the previously set authentication information with information related to a connection position of the portable connection device connected to the network device included in the device information, and switches, when the connection position of the portable connection device is determined to coincide with the connection candidate position, a network that the terminal device connected to the portable connection device is allowed to access according to the connection position.

10. The network device according to claim 9, wherein the processor determines to prevent the access from the terminal device when the connection position of the portable connection device is different from the connection candidate position.

11. The network device according to claim 8, wherein the processor compares terminal information that identifies the terminal device connected to the portable connection device included in the previously set authentication information with the acquired identification information on the terminal device, and determines to prevent the access from the terminal device when the terminal information is different from the identification information.

12. The network device according to claim 11, wherein the network device is to be connected connecting thereto the portable connection device holding the authentication information set by a setting device that sets the authentication information for the portable connection device, and the terminal information included in the previously set authentication information is identification information on the terminal device acquired by the setting device through the portable connection device from the terminal device in a state where the portable connection device is connected to the setting device and the terminal device is connected to the portable connection device.

13. The network device according to claim 8, wherein the network device further includes a plurality of ports to be connected thereto the portable connection device, and the processor blocks the port to which the portable connection device is connected when the processor determines to prevent the access from the terminal device.

14. The network device according to claim 8, wherein the network device is to be connected thereto the portable connection device that is an adapter through which the terminal device connected to the portable connection device accesses the network device.

15. A connection control method in a network system including a network device and a portable connection device to be connected thereto a terminal device which accesses the network device, the method comprising:

in the portable connection device, setting authentication information related to the connection between the network device and the terminal device and holding the authentication information, and in the network device, acquiring the authentication information held in the portable connection device according to the connection of the portable connection device to the network device;

acquires identification information on the terminal device from the terminal device according to the connection of the terminal device to the portable connection device; and compares the acquired authentication information with the identification information on the terminal device and device information on the network device to determine whether or not the access from the terminal device is allowed.

16. The connection control method according to claim 15, wherein the method further comprises:

in the network device, comparing, in the determination, setting information related to one or more connection candidate positions of the portable connection device to the network device included in the previously set authentication information with information related to a connection position of the portable connection device connected to the network device included in the device information, and switching, when the connection position of the portable connection device is determined to coincide with the connection candidate position, a network that the terminal device connected to the portable connection device is allowed to access according to the connection position.

17. The connection control method according to claim 16, wherein the method further comprises:

in the network device, determining, in the determination, to prevent the access from the terminal device when the connection position of the portable connection device is different from the connection candidate position.

18. The connection control method according to claim 15, wherein the method further comprises:

in the network device, comparing, in the determination, terminal information that identifies the terminal device connected to the portable connection device included in the previously set authentication information with the acquired identification information on the terminal device, and determining to prevent the access from the terminal device when the terminal information is different from the identification information.

19. The connection control method according to claim 18, wherein the method further comprises:

in a setting device that sets the authentication information for the portable connection device,
- detecting the connection of the portable connection device to the setting device;
- detecting the connection of the terminal device to the portable connection device in a state where the portable connection device is connected to the setting device;
- acquiring the terminal information that is identification information on the terminal device through the portable connection device from the terminal device; and
- including the acquired terminal information in the authentication information to set the authentication information in the portable connection device.

20. The connection control method according to claim 15, wherein the method further comprises:

in the network device, blocking, in the determination, a port to which the portable connection device is connected, among a plurality of ports to be connected connecting thereto the portable connection device and included in the network device, when the network device determines to prevent the access from the terminal device.

* * * * *